US006527295B2

(12) United States Patent
Müller

(10) Patent No.: US 6,527,295 B2
(45) Date of Patent: Mar. 4, 2003

(54) AIRBAG SYSTEM WITH A CONTROLLED COVER CONFIGURATION

(75) Inventor: Olaf Müller, Rüsselsheim (DE)

(73) Assignee: Volkswagen AG, Wolfsburg (DE)

(*) Notice: Subject to any disclaimer, the term of this patent is extended or adjusted under 35 U.S.C. 154(b) by 0 days.

(21) Appl. No.: 10/080,359

(22) Filed: Feb. 21, 2002

(65) Prior Publication Data

US 2002/0089153 A1 Jul. 11, 2002

Related U.S. Application Data

(63) Continuation of application No. PCT/DE00/02892, filed on Aug. 24, 2000.

(30) Foreign Application Priority Data

Aug. 24, 1999 (DE) .................................... 299 14 767 U
Sep. 2, 1999 (DE) .................................... 299 15 423 U

(51) Int. Cl.$^7$ ............................................ B60R 21/16
(52) U.S. Cl. .................................. 280/728.3; 280/732
(58) Field of Search .......................... 280/728.3, 732, 280/742, 736, 728.1, 728.2

(56) References Cited

U.S. PATENT DOCUMENTS

| 4,773,673 A | * | 9/1988 | Sakurai | 280/728.3 |
| 5,344,184 A | * | 9/1994 | Keeler et al. | 280/730.1 |
| 5,897,135 A | * | 4/1999 | Oehm | 280/728.3 |
| 5,899,488 A | * | 5/1999 | Muller | 280/728.3 |
| 6,315,321 B1 | * | 11/2001 | Lutz | 280/728.3 |
| 6,349,963 B1 | * | 2/2002 | Muller | 280/728.3 |
| 6,357,785 B1 | * | 3/2002 | Heilig | 280/728.2 |

FOREIGN PATENT DOCUMENTS

| DE | 297 21 644 U1 | 5/1998 |
| DE | 297 21 682 U1 * | 5/1998 |
| DE | 197 57 435 A1 | 7/1998 |
| DE | 197 26 878 A1 | 10/1998 |
| DE | 197 33 896 A1 | 2/1999 |
| DE | 299 14 924 U1 | 2/2000 |
| EP | 0 867 346 A1 | 9/1998 |
| EP | 1 004 481 A2 | 5/2000 |
| WO | WO 99/61288 | 12/1999 |

* cited by examiner

Primary Examiner—Paul N. Dickson
Assistant Examiner—David R. Dunn
(74) Attorney, Agent, or Firm—Laurence A. Greenberg; Werner H. Stemer; Gregory L. Mayback

(57) ABSTRACT

An airbag system includes at least one cover configuration movable from a closed position to an open position. An airbag is disposed behind the at least one cover configuration when the at least one cover configuration is in the closed position. The airbag is configured to expand when being filled with gas. A control device includes a gas generating configuration and a mechanical configuration. The gas generating configuration and the mechanical configuration operate as a drive configuration for moving the at least one cover configuration from the closed position to the open position for allowing the airbag to expand.

17 Claims, 28 Drawing Sheets

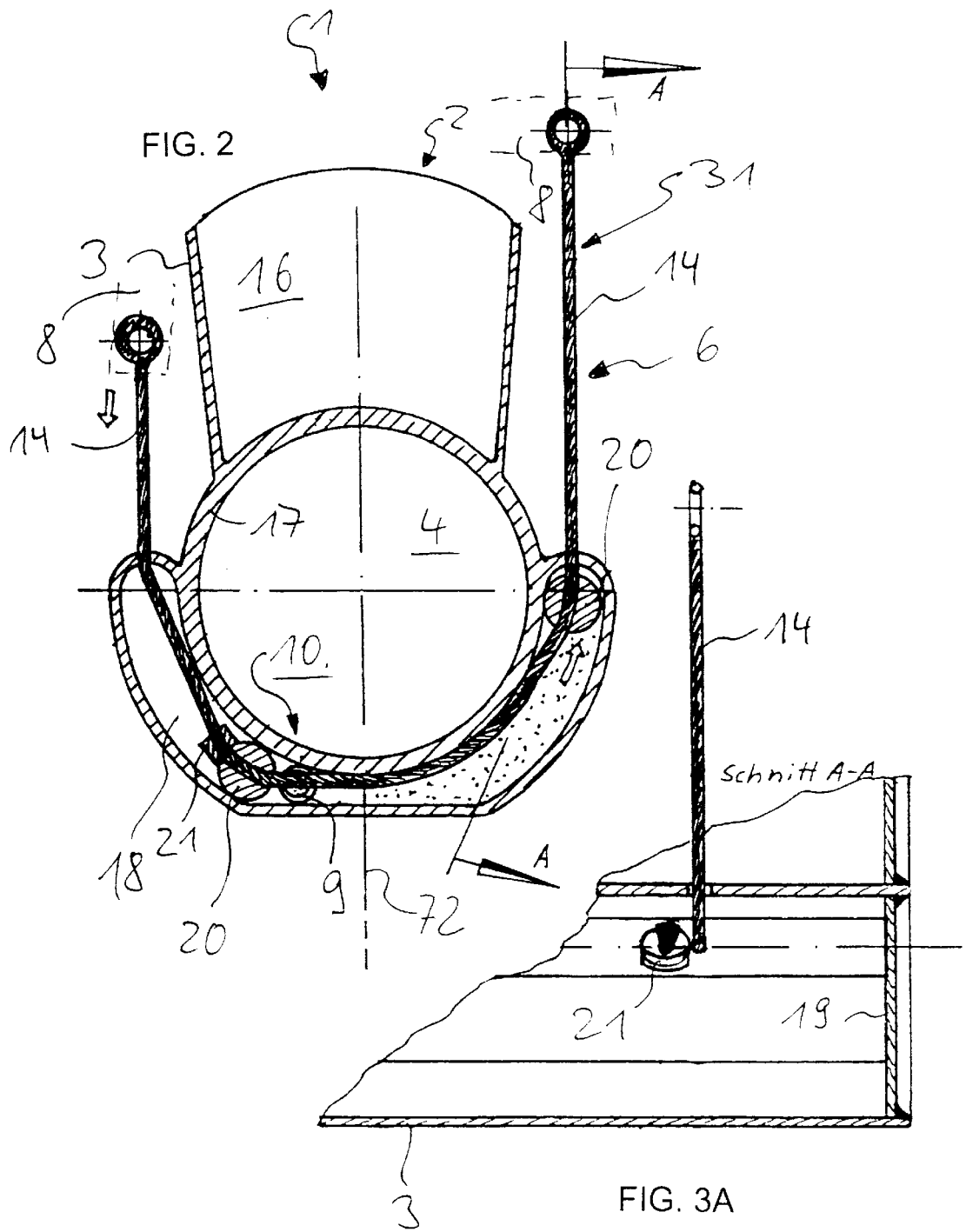

AIRBAG SYSTEM WITH A CONTROLLED COVER CONFIGURATION

CROSS-REFERENCE TO RELATED APPLICATION

This application is a continuation of copending International Application No. PCT/DE00/02892, filed Aug. 24, 2000, which designated the United States.

BACKGROUND OF THE INVENTION

FIELD OF THE INVENTION

The invention relates to an airbag system having at least one cover configuration that is movable from a closed position to an open position. The airbag system includes an airbag which is accommodated behind the cover configuration when the cover configuration is in the closed position.

Airbag systems and methods of triggering an airbag system are for example described in Published, Non-Prosecuted German Patent Application Nos. DE 197 26 878.1 A1 and DE 197 33 896.8, European Patent Application No. 0 867 346 A1, and International Publication No. WO 99/61288, which are assigned to the same assignee to which the present invention is assigned. In particular, European Patent Application No. 0 867 346 A1 discloses airbag flaps that are retracted into the housing of the airbag module. A separate mechanism is used to retract the airbag flaps before the airbag emerges from the dashboard.

SUMMARY OF THE INVENTION

It is accordingly an object of the invention to provide an airbag system which is improved with respect to conventional airbag systems. It is in particular an object of the invention to provide an airbag system having advantageous mechanisms and drives for opening airbag flaps.

The invention relates to improvements over the technology and the exemplary embodiments described in prior applications. The invention relates in particular to improvements for the construction of airbag systems and their trigger control, and especially to the control of an airbag flap or airbag cover. The basic idea of the invention is that the respective airbag cover is removed by auxiliary devices and not directly by the airbag itself. As a result, the airbag can deploy with a reduced aggressiveness and with a reduced pressure and hence without risk of causing injury.

With the foregoing and other objects in view there is provided, in accordance with the invention, an airbag system, including:

at least one cover configuration movable from a closed position to an open position;

an airbag disposed behind the at least one cover configuration when the at least one cover configuration is in the closed position, the airbag being configured to expand when being filled with gas; and a control device including a gas generating configuration and a mechanical configuration, the gas generating configuration and the mechanical configuration operating as a drive configuration for moving the at least one cover configuration from the closed position to the open position for allowing the airbag to expand.

It is noted that whenever the invention is described by illustrating a driver or passenger airbag system configured as an airbag module with a retractable airbag cover, the description is merely an illustrative example and it is not intended to limit the invention to driver or passenger airbag systems. The invention can advantageously be used not only for frontal airbag systems but also for other airbag systems.

In general terms, the invention provides an airbag system having at least one cover configuration, behind which, in a closed position, an airbag is accommodated, wherein the airbag expands by being filled with a gas, wherein, through the use of a control, the cover configuration can be moved from the closed position into an open position in order to permit an expansion of the airbag, wherein the control includes a gas generating configuration and a mechanical configuration as drive devices for moving the cover configuration from the closed position into the open position.

In accordance with a preferred feature of the invention, the airbag system is provided such that the gas generating configuration includes an airbag gas generator, and that an airbag module is provided, which includes at least the airbag gas generator and the airbag.

According to another feature of the invention, the airbag module includes a housing, which is at least substantially formed of an extruded profile. Alternatively or additionally the at least one cover configuration may be incorporated in the airbag module or combined therewith, or it may be an integral part of a vehicle interior trim and connected to the airbag module.

According to a further feature of the invention, the gas generating configuration includes a drive gas generator which is connected to the mechanical configuration.

According to yet a further feature of the invention, the drive gas generator is an element that is separate from the airbag module and is disposed at the airbag module or separated from the airbag module.

The mechanical configuration may preferably also include a drive unit or a plurality of drive units, which can be acted upon by gas from the gas generating configuration, for shifting the cover configuration from the closed position into the open position.

According to another feature of the invention, each drive unit includes a piston.

According to yet another feature of the invention, the mechanical configuration has a forced control for driving a plurality of cover configurations in a coordinated manner.

According to a further feature of the invention, the mechanical configuration includes cables, linkages and/or fabrics for transmitting a movement.

Further preferred and/or advantageous embodiments of the invention and other features which are considered as characteristic for the invention are set forth in the claims and in combinations of the claims.

Although the invention is illustrated and described herein as embodied in an airbag system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagrammatic sectional view of a second exemplary embodiment of an airbag device according to the invention illustrating a triggering of the airbag device;

FIG. 3A is an enlarged diagrammatic sectional view of the second exemplary embodiment shown in FIG. 2 along section line A—A;

DESCRIPTION OF THE PREFERRED EMBODIMENTS

Figure 1:
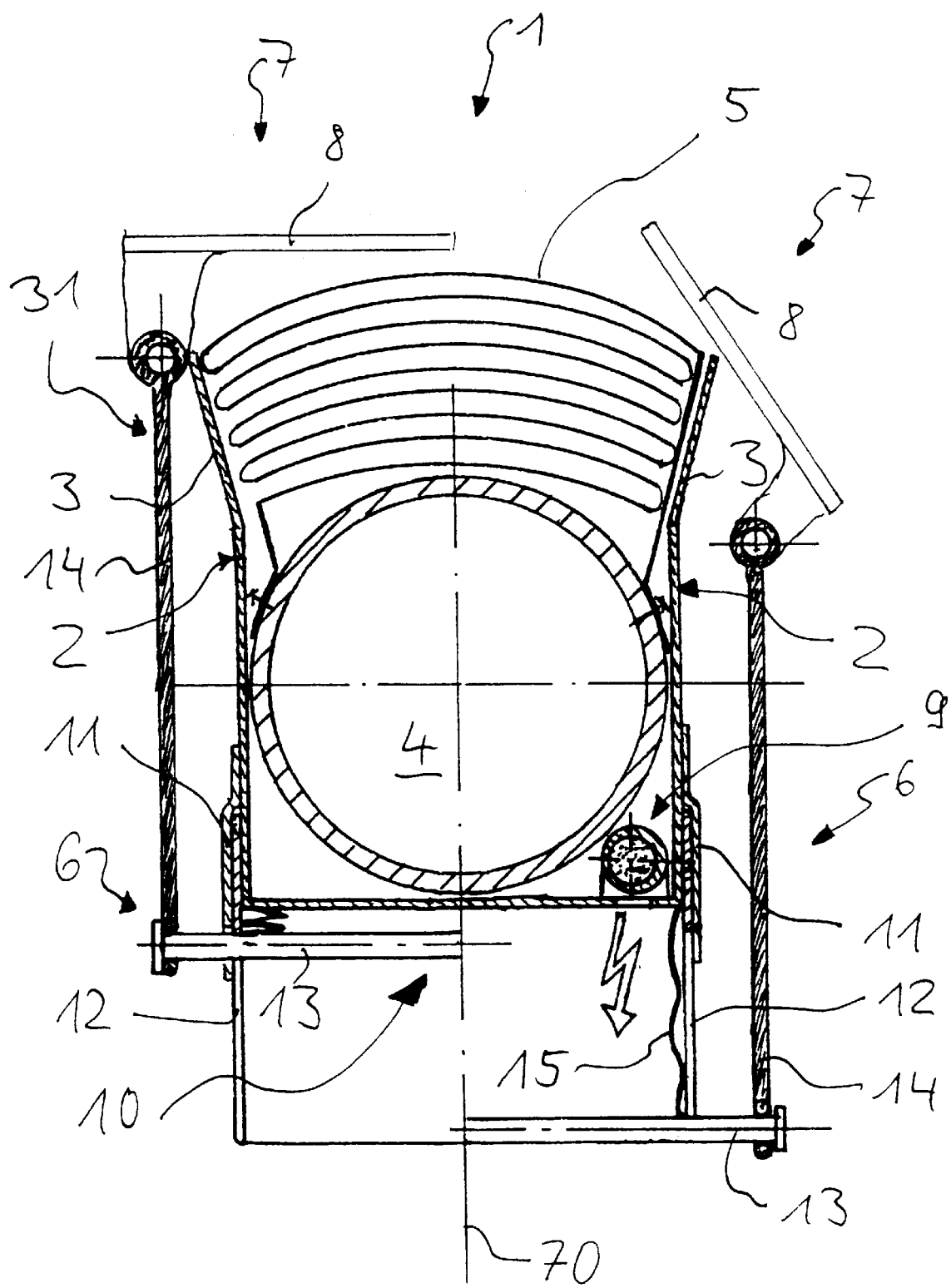
FIG. 1 is a diagrammatic sectional view of a first exemplary embodiment of an airbag device according to the invention illustrating a triggering of the airbag device.

Referring now to the figures of the drawings, the airbag configurations according to the invention are described in more detail. Identical reference numbers in the individual figures and illustrations of the drawings denote identical or similar components or components functioning in an identical or similar manner. The drawings also disclose features that are not provided with reference numbers and, irrespective of whether such features are described below, a person of skill in the art readily comprehends these features. On the other hand, features that are mentioned in this description but are not visible or represented in the drawing will also be readily comprehensible for a person skilled in the art.

Individual features specified and/or represented in connection with actual exemplary embodiments are not limited to these exemplary embodiments or to combination with the other features of these exemplary embodiments, but may, insofar as technically feasible, be combined with any other variants, even where they are not dealt with separately in the present description. As stated above, the present invention relates to an airbag system having at least one cover configuration that is movable from a closed position to an open position. Such airbag systems and methods of triggering an airbag system are for example generally described in the above-mentioned patent applications. Furthermore, German Patent Application No. 197 12 782.7 and German Utility Model Application Nos. 298 08 317.5, 298 09 554.8, 298 19 165.2, 298 20 722.2, 299 05 000.9, 299 05 919.7, 299 07 102.2, 299 08 946.0, 299 10 059.6 and 299 13 628 are assigned to the same assignee to which the present invention is assigned.

FIG. 1 shows a sectional view of a first embodiment of an airbag system 1 having an airbag module 2, which has a module housing 3, in which an airbag gas generator 4, an airbag 5 and mechanical configurations 6, which are situated underneath the airbag 5, are (at least partially) accommodated. The mechanical configurations 6 constitute an opening mechanism for cover configurations 7, which are in the form of airbag flaps 8. Furthermore, a separate drive gas generator 9 is provided, which is formed by a pyrotechnic cartridge, for example, and which, together with the airbag gas generator 4, belongs to the gas generating configurations 10. The drive gas generator 9 provides gas to a reservoir 12 moveably supported in guides 11, which are an integral part of the mechanical configurations 6. The reservoir 12 might also be supplied with gas from the airbag gas generator 4, such that the gas would then flow out of a suitable hole (not shown). Drivers or followers 13, to which traction cables 14 are attached for transmitting forces to the airbag flaps 8, are attached beneath the reservoir 12, which functions like a piston to which gas can be admitted from the drive gas generator 9. The reservoir 12 is preferably sealed off by a diaphragm seal 15 fixed on both sides to prevent gas from escaping. On the left side of FIG. 1, i.e. to the left of line 70, the reservoir 12 is shown in its position before an accident. The right side of FIG. 1 shows the reservoir 12 after an accident with the airbag system 1 being triggered.

Figure 3C:
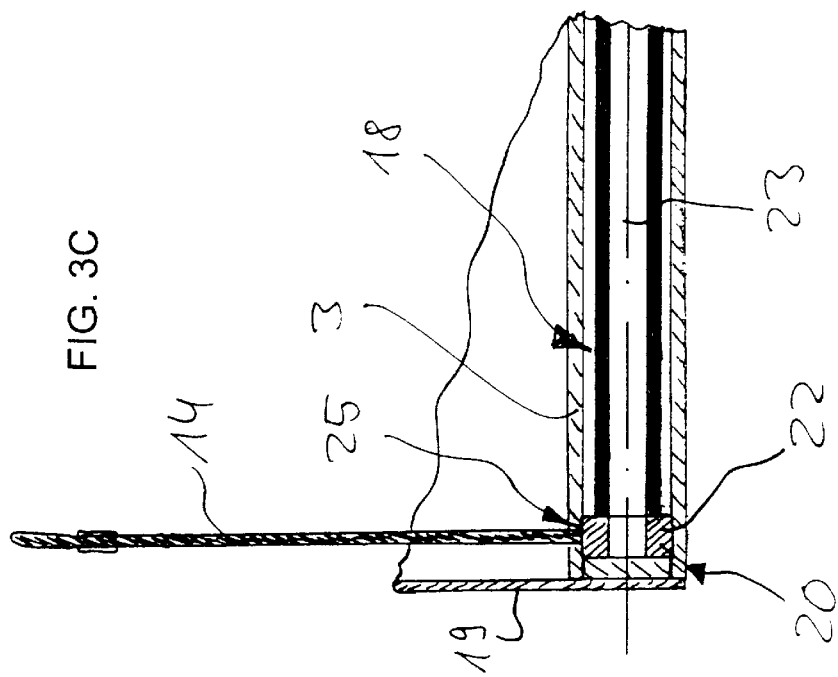
FIG. 3C is an enlarged diagrammatic sectional view of the modification of the second exemplary embodiment of an airbag device shown in FIG. 3B along section line D—D.

FIG. 2 is a diagrammatic sectional view of a second exemplary embodiment of an airbag system. The left side of FIG. 2, i.e. to the left of line 72, illustrates the airbag system before the triggering of the airbag device. The right side of FIG. 2 illustrates the airbag system after being triggered. FIGS. 2 to 3C show a further developed embodiment of the airbag system 1, wherein the module housing 3 is advantageously manufactured from an extruded profile. An airbag seating chamber 16, a generator housing 17 and a propellant pressure chamber 18 form one unit which is sealed by covers 19 on the end face. Rod-shaped pistons 20 lie in the pressure chamber. The cables 14 are drawn through these pistons 20 in turn and are correspondingly fixed through the use of cable eye stiffeners 21. FIG. 2 shows the starting position of the pistons 20. In the event of a crash and hence triggering of the airbag system 1, the gas pressure generated by the pyrotechnic cartridge of the drive gas generator 9 pushes the pistons 20, each having the shape of a rod, into their limit position, which is shown in FIG. 2. In so doing, a piston 20 takes two cables 14 of one side, that is to say of one airbag flap 8, with it, whilst the other two cables 14 for the other side, that is to say the other airbag flap 8, slide through it. FIG. 3A shows a detail of this embodiment in the form of an attachment of one of the cables 14 to a piston 20.

In this version described above with reference to FIGS. 2 and 3A, the movement of the piston(s) 20 may also be effected by gas pressure from the airbag gas generator 4.

A further possibility when configuring the versions described above and other versions is, for example, the actuation of only one airbag flap 8 by just one piston 20 and two cables 14.

Figure 3B:
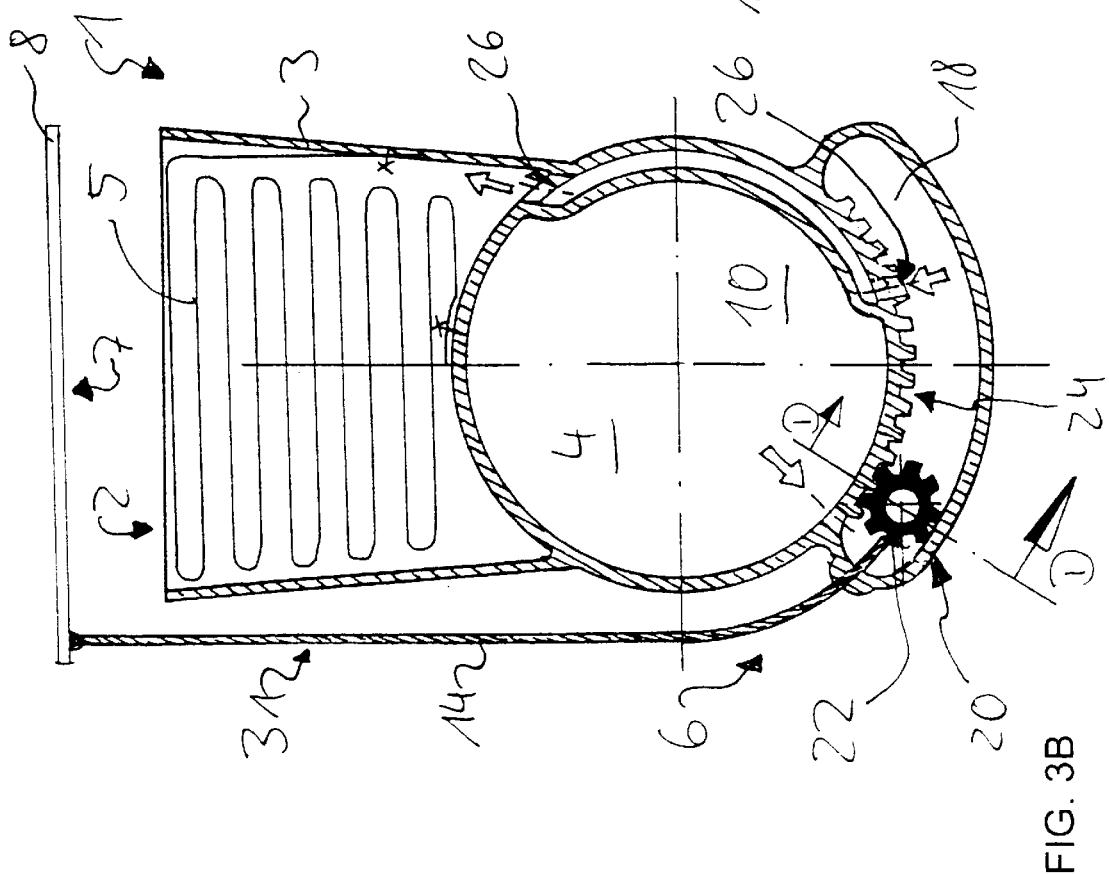
FIG. 3B is a diagrammatic sectional view of a modification of the second exemplary embodiment of an airbag device shown in FIG. 2.

If the piston(s) 20 has/have a tendency to tilt due to differing release forces and might jam as a result, it is possible, as shown in FIGS. 3B and 3C, to use a piston 20 that is configured as a gear-like roller 22, which rotates about its piston axis 23 as it moves from a starting position to a limit position and in so doing runs on a toothing 24 on the module housing 3, formed from an extruded profile, inside the propellant pressure chamber 18. This toothing 24 compels the piston 20 to run uniformly, that is to say without tilting. For attaching the cables 14, sleeves 25, which form a positively interlocking, i.e. form-fitting seal just like the intervening toothed roller 22 of the piston 20 in the housing 3, or more precisely in the propellant pressure chamber 18, are fixed to the ends of the piston axis 23. In this example, the piston 20 is acted upon by gas from the airbag gas generator 4. Once the piston 20 has opened the airbag flap(s) by way of the cables 14, the piston 20 has also reached a point at which gas through-flow holes 26 for the airbag 5 are opened. This method of acting upon the mechanical configurations 6 on the one hand and then upon the airbag 5 on the other through the use of gas from the same gas generator, that is the airbag gas generator 4, which in this case alone forms the gas generating configurations 10, since no separate drive gas generator is either provided or necessary, is one embodiment of a forced gas control. A piston system opens the flap and then through its travel opens the admission of the gas into the airbag. FIGS. 3B and 3C show an example of this configuration with a piston 20 shown in a longitudinal and a transverse sectional view.

Figure 4:
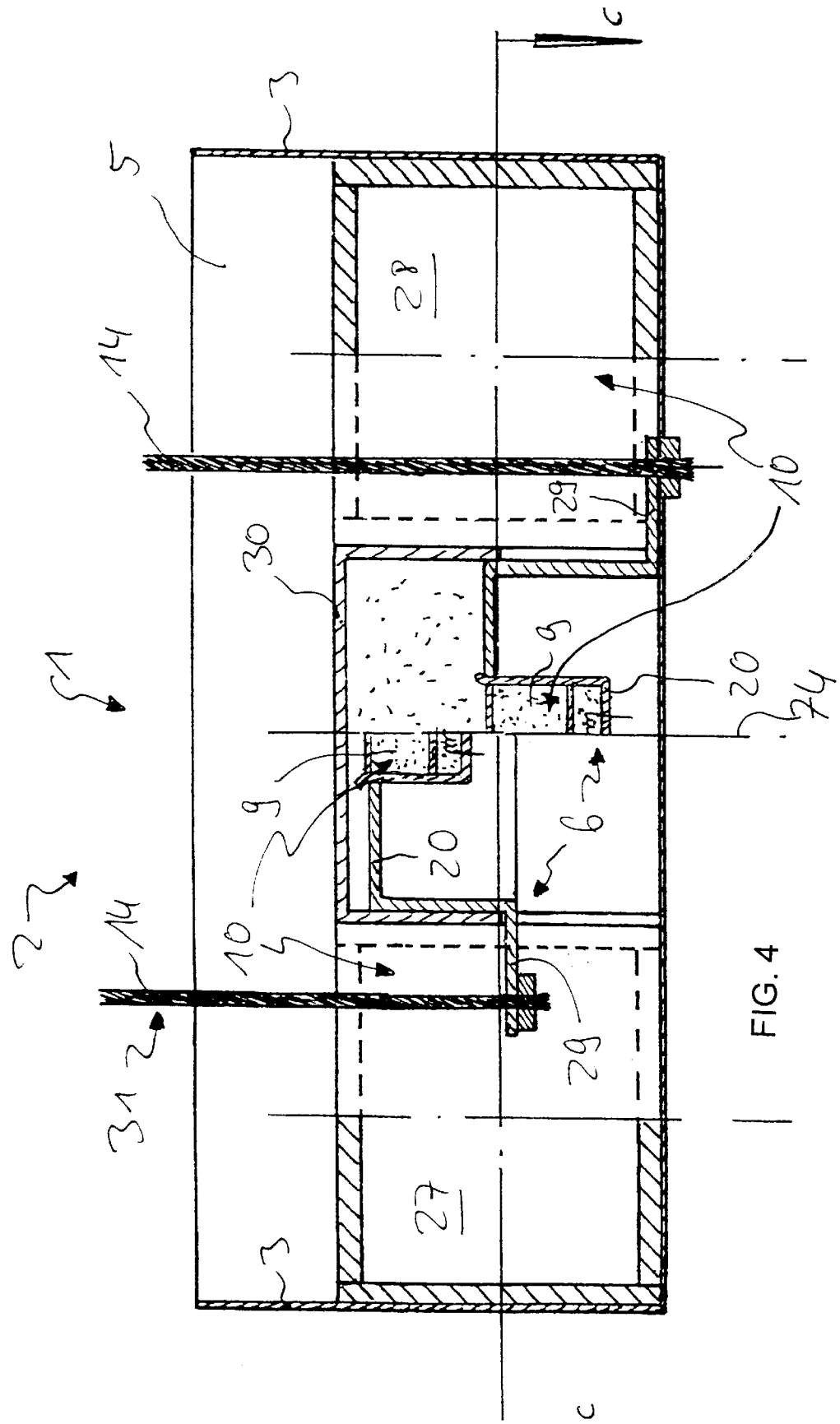
FIG. 4 is a diagrammatic sectional view of a third exemplary embodiment of an airbag device according to the invention illustrating a triggering of the airbag device, wherein the sectional view is taken along section line B—B shown in FIG. 5.
Figure 5:
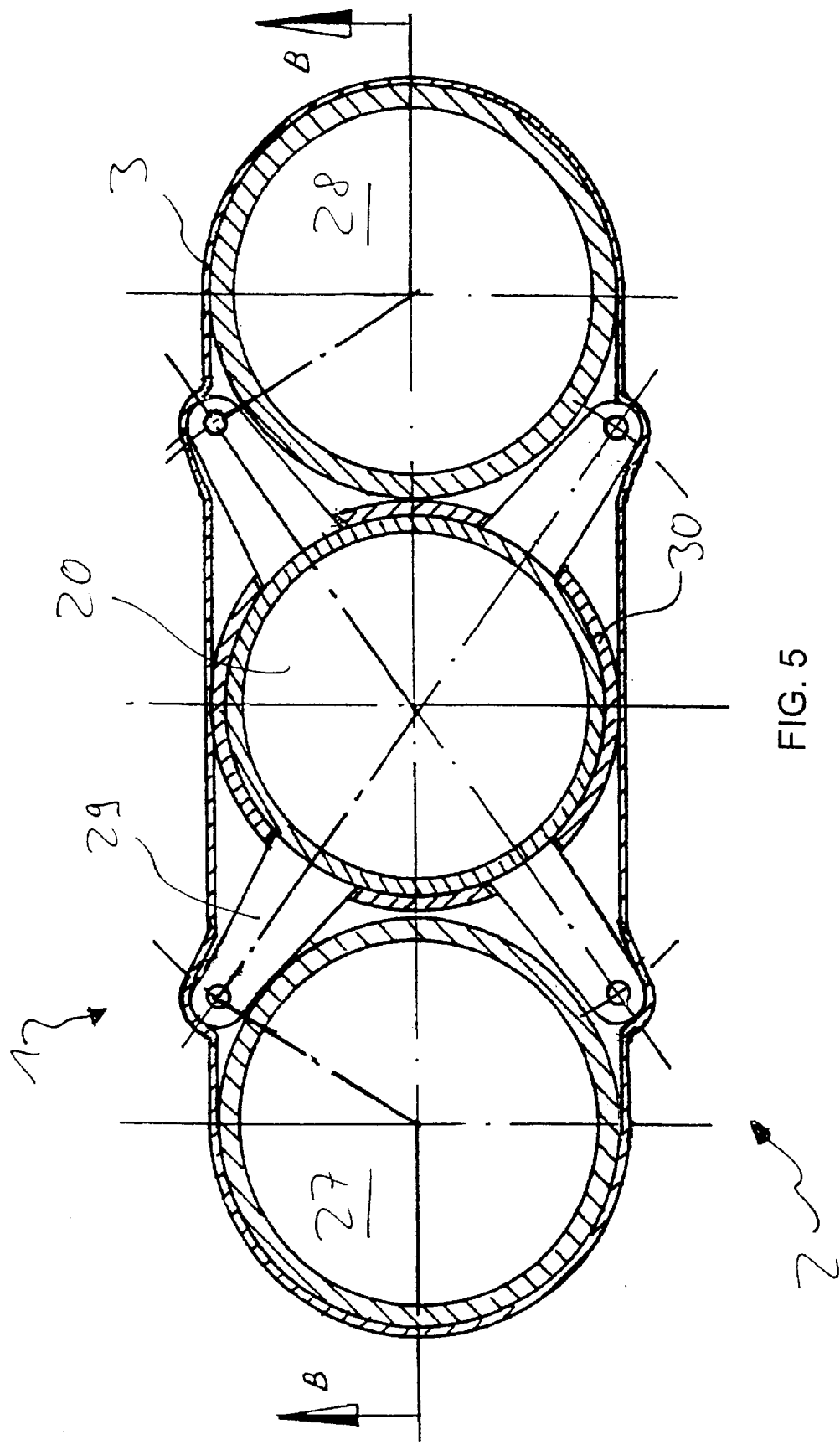
FIG. 5 is a diagrammatic sectional view of the third exemplary embodiment shown in FIG. 4 along section line C—C.

FIGS. 4 and 5 show a further alternative of the airbag system 1. The piston 20 for drawing the four cables 14 is supported in the middle of the airbag module 2 between, for example, a first and a second generator stage 27 and 28. The left side of FIG. 4, i.e. to the left of line 74, shows the starting position. The right side of FIG. 4 shows the piston position following a crash, that is to say after an actuation of the airbag system 1. FIG. 5 is a central sectional view of the piston 20 with radial arms 29, to which the cables 14 are fixed.

Figure 6:
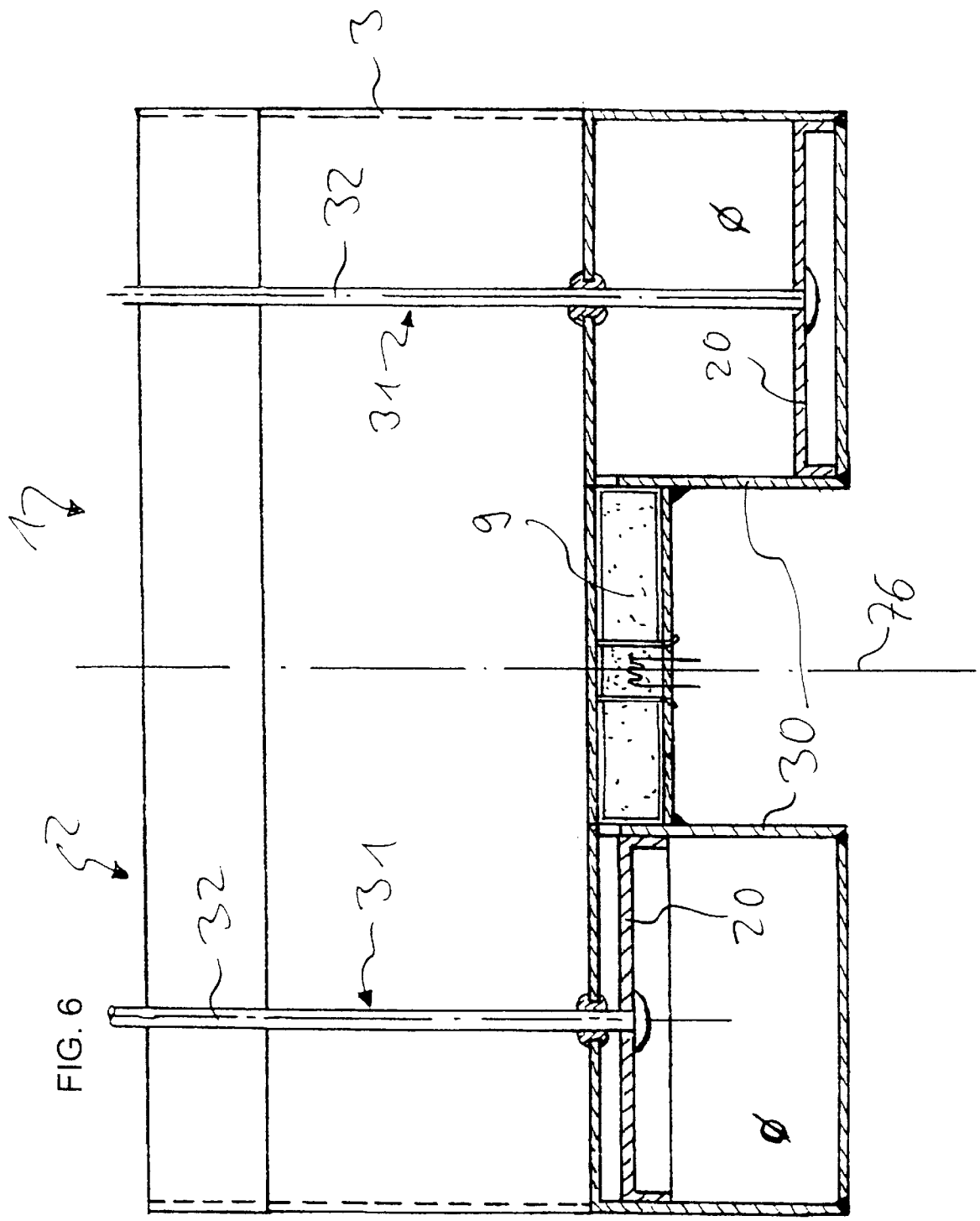
FIG. 6 is a diagrammatic sectional view of a fourth exemplary embodiment of an airbag device according to the invention illustrating a triggering of the airbag device.

FIG. 6 shows a further alternative, in which, for example, two pistons 20 in cylinders 30 are fixed beneath a conventional airbag module 2. Both cylinders 30 are filled by a common pyrotechnic cartridge of the separate drive gas generator 9. This configuration permits the use of draw elements 31 in the form of rods 32 instead of the cables used in the configurations described above. The rods 32 must be sealed. The left side of FIG. 6 shows the starting position, and the right side of FIG. 6 shows the position following a crash, that is after the triggering of the airbag system 1.

Figure 7:
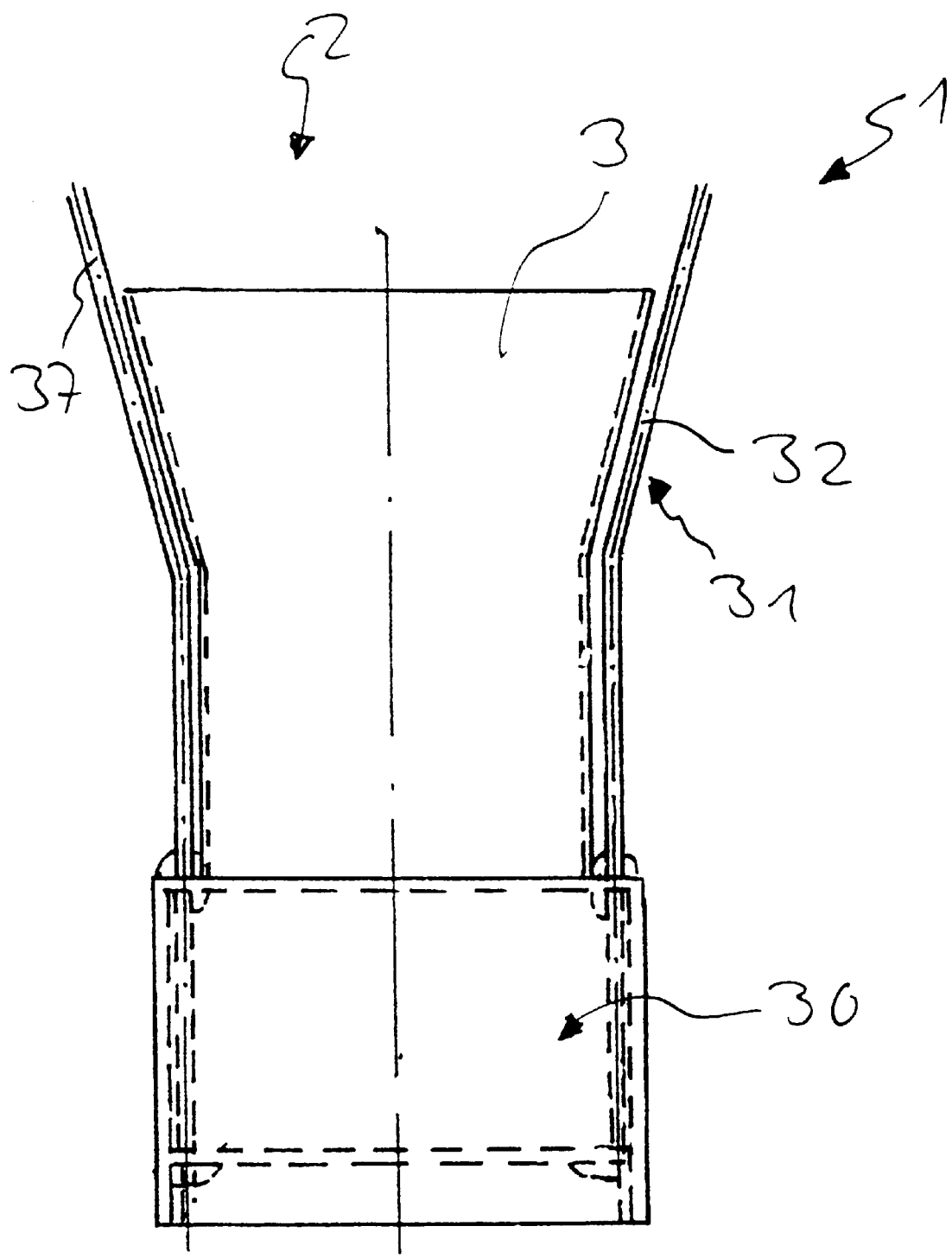
FIG. 7 is an enlarged diagrammatic side view of a first modification for an airbag device according to the invention.

FIG. 7 shows cylinders 30 projecting laterally beyond the airbag module 2. Draw rods 32 can be guided in a straight line through the upper cover of the cylinders 30. This configuration is more cost-effective to produce than deflected cables.

Figure 8:
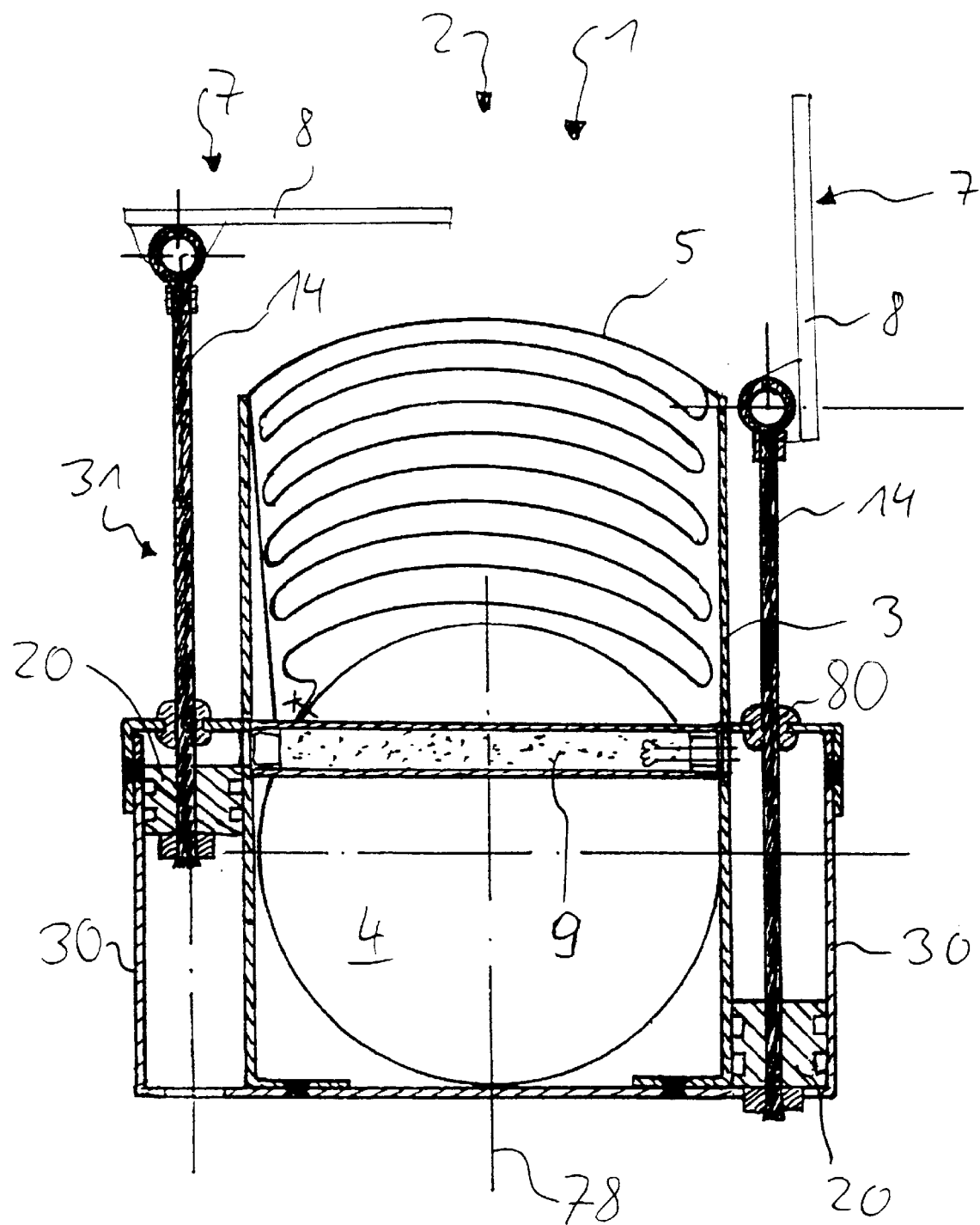
FIG. 8 is a diagrammatic sectional view of a fifth exemplary embodiment of an airbag device according to the invention illustrating a triggering of the airbag device.

FIG. 8 shows cylinders 30 laterally attached to an airbag module 2, preferably along the entire length of the airbag module 2. Rod-shaped pistons 20 are supported in these cylinders 30 and cables 14 are fixed to the rod-shaped pistons 20. A seal 80 is provided between the cables 14 and the cylinder 30. Here too, it is possible to have a gas act upon both cylinders 30, wherein a drive gas generator 9 in the form of a pyrotechnic cartridge is installed between the cylinders 30. The gas could, however, also be drawn from the airbag gas generator 4. The left side of FIG. 8, i.e. to the left of line 78, illustrates the starting position, and the right side of FIG. 8 shows the position following a crash, that is to say after a triggering of the airbag system 1.

Figure 9:
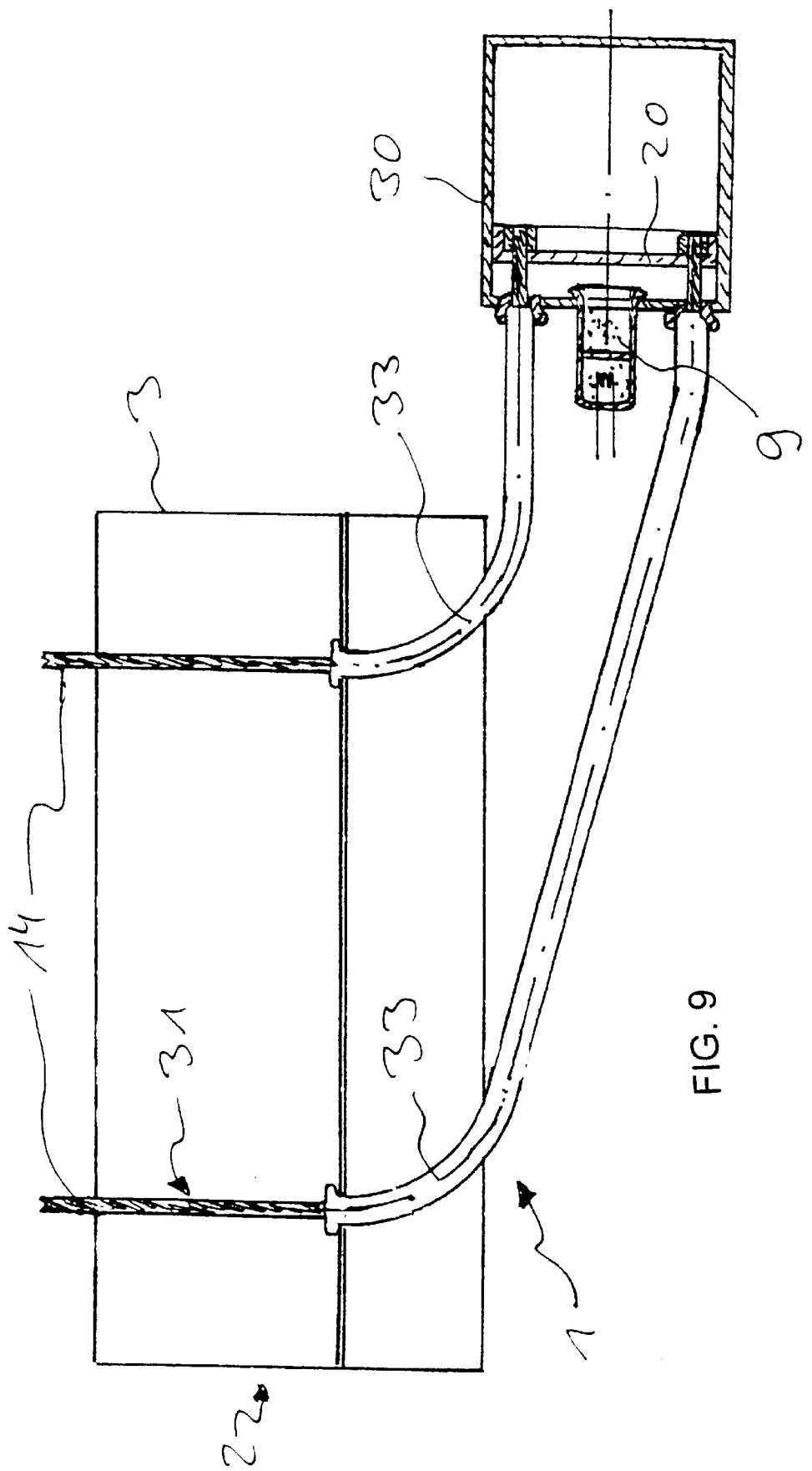
FIG. 9 is an enlarged diagrammatic partial sectional view of a second modification for an airbag device according to the invention.

FIG. 9 shows a configuration that is designed to overcome stowing problems, in which the cables 14 are part of a four-fold Bowden cable system, for example, with two Bowden cables 33 for each airbag flap (not shown). Here the cylinder 30 can be fitted at any position in relation to the airbag module 2, for example behind a vehicle interior trim (not shown).

Figure 10:
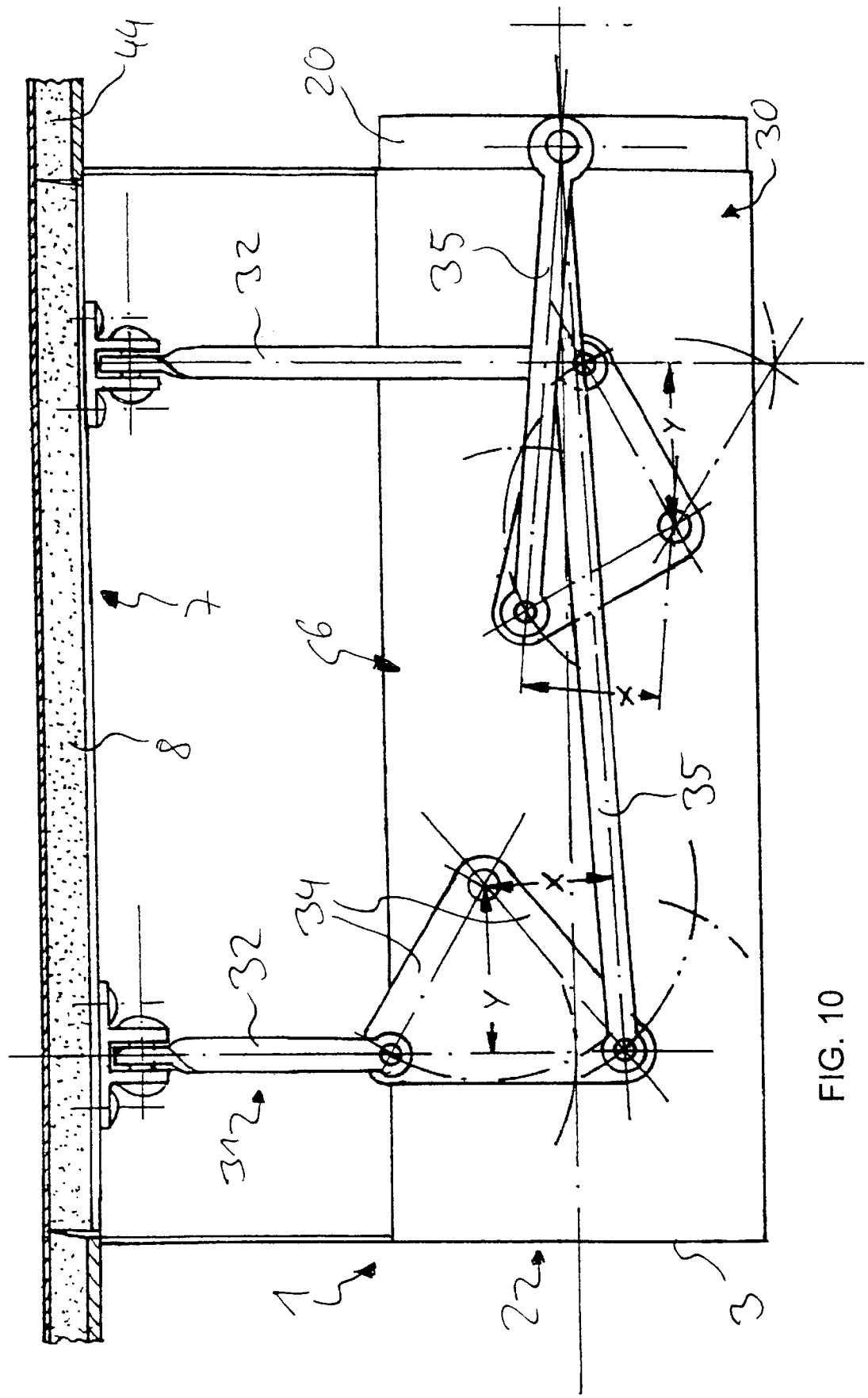
FIGS. 10 and 11 are diagrammatic sectional views of a sixth exemplary embodiment of an airbag device according to the invention before and, respectively, after a triggering of the airbag device.
Figure 11:
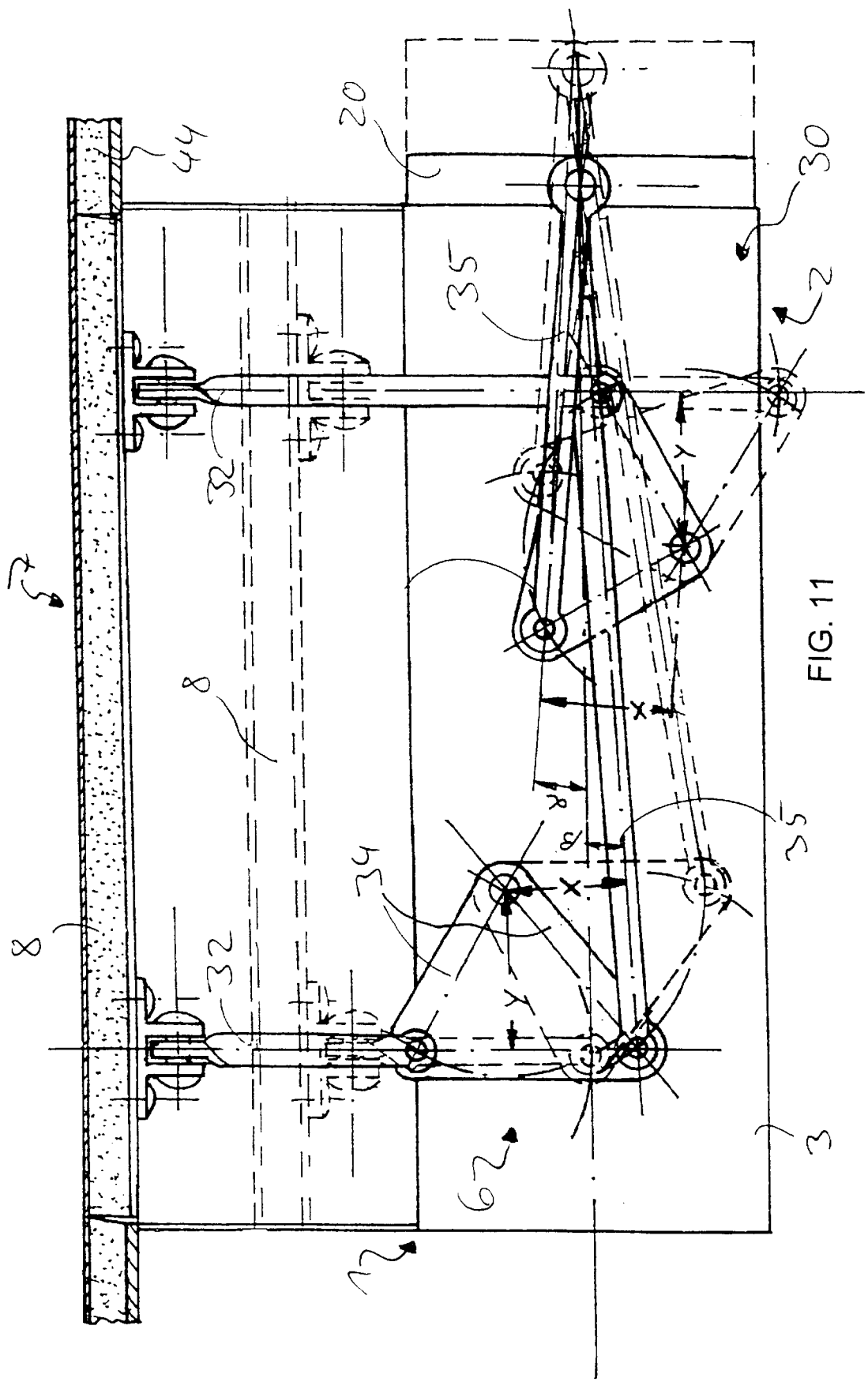

FIGS. 10 and 11 show, in particular, an opening mechanism of the mechanical configurations 6 using four draw rods 32, which are fixed to deflection levers 34. In turn, driving draw rods 35 act on the deflection levers 34. The driving draw rods 35 are fixed to pistons 20 previously described. The exceptional features of this alternative of the present invention are as follows:

The deflection levers 34 can be geometrically disposed so that all forces are easily manageable tensile forces.

The deflection levers 34 can be configured so as to achieve an advantageous x/y transmission ratio, that is to say a powerful cylinder 30 can perform the required stroke for different airbag flaps 8 with a relatively short stroke. In practice, this means that by using specific deflection levers 34 different dashboards can be equipped with the same basic module or its piston 20 and piston stroke.

Furthermore, the deflection levers 34 can be attached to the airbag module 2 in such a way that, in their drawing direction, the deflection levers 34 deviate from the center axis by the same angle α/β—even during the movement (see FIG. 11, for example). In practice, this means that the pistons 20 are virtually free of lateral forces, despite obliquely disposed draw rods 32.

In addition to the starting position of the mechanism, as shown in FIG. 10, FIG. 11 also shows its limit position.

Figure 12:
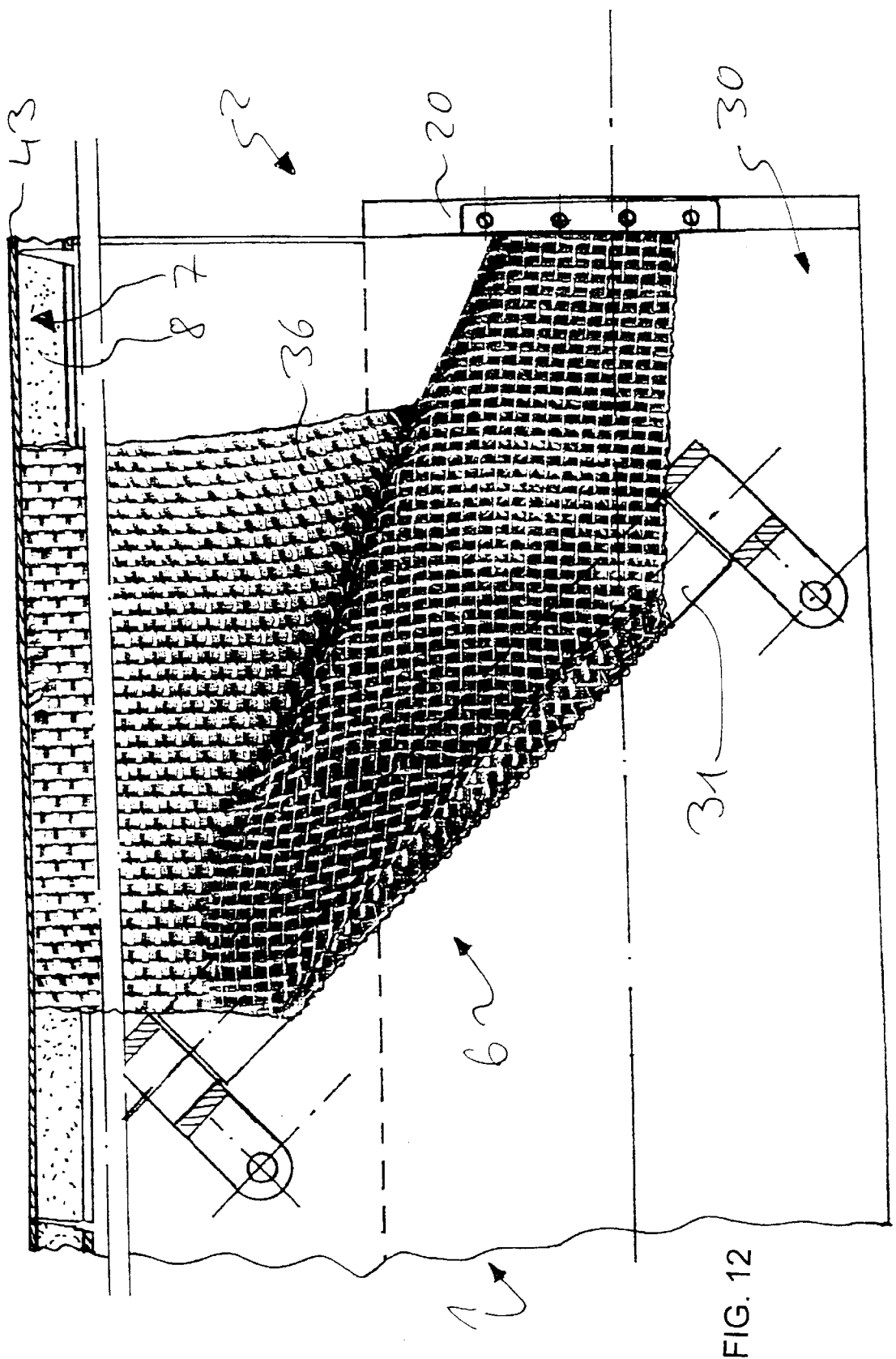
FIG. 12 is an enlarged diagrammatic top view of a third modification for an airbag device according to the invention.

FIG. 12 shows a further alternative for deflecting the tensile force from a cylinder 30 of the mechanical configurations 6 to the airbag flap 8, wherein the cylinder 30 is positioned perpendicular to an airbag flap 8. In the above-mentioned patent applications assigned to the assignee of the present invention, it is described that in the case of retractable airbag covers or flaps 8, an outer skin (not shown) of a vehicle interior trim (not shown) can be provided with a bonded-on or inlayed fabric 36, in order to prevent any "splitting open" of the airbag flap 8. This fabric 36 of sufficient length is placed around a draw element or pulling element 31 in the form of a rod or roller, positioned at an angle of for example 45 degrees to the airbag flap, and then has the desired pulling direction for the drawing piston (not visible in FIG. 12). The fabric 36 is laterally fixed to the piston. Bands, cables or similar pulling devices can of course also be used instead of the fabric.

Figure 13:
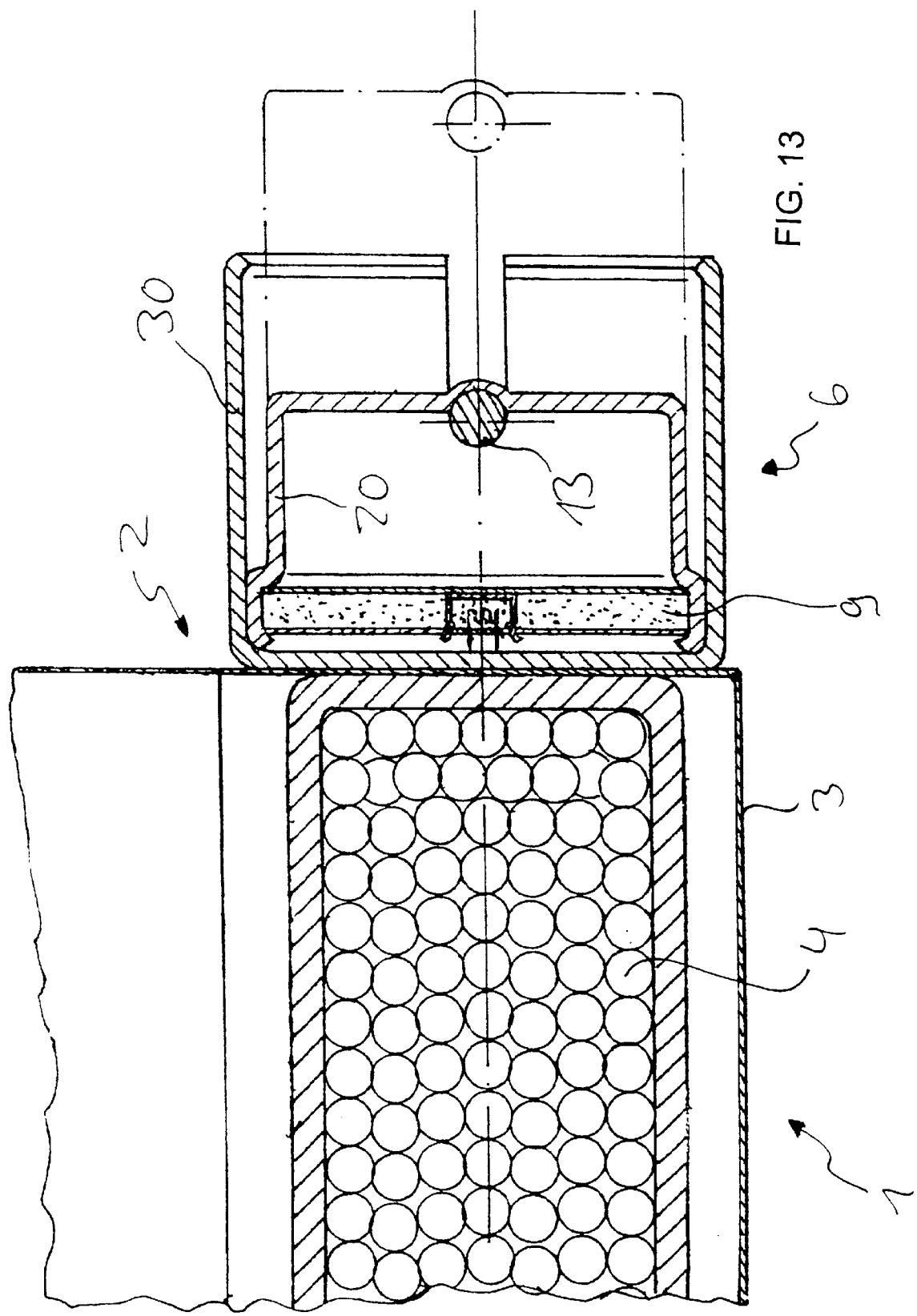
FIG. 13 is an enlarged diagrammatic sectional view of a fourth modification for an airbag device according to the invention.

As an alternative energy source, FIG. 13 shows a cylinder 30 having a piston 20 and its own pyrotechnic drive gas generator, wherein the cylinder 30 is attached to the airbag module 8. It can be seen that the space required is twice the stroke plus the housing walls. An adapted driver 13 is fitted to the piston 20. This is, for example, a pin for a mechanism according to FIG. 10. Even though the cost of the configuration according to FIG. 13 is greater than in the case of other variants, particularly those described above and in the above-mentioned applications assigned to the assignee of the present invention, other criteria such as actuation, controlling, monitoring etc. can be advantageously met by a variant according to FIG. 13.

Figure 14:
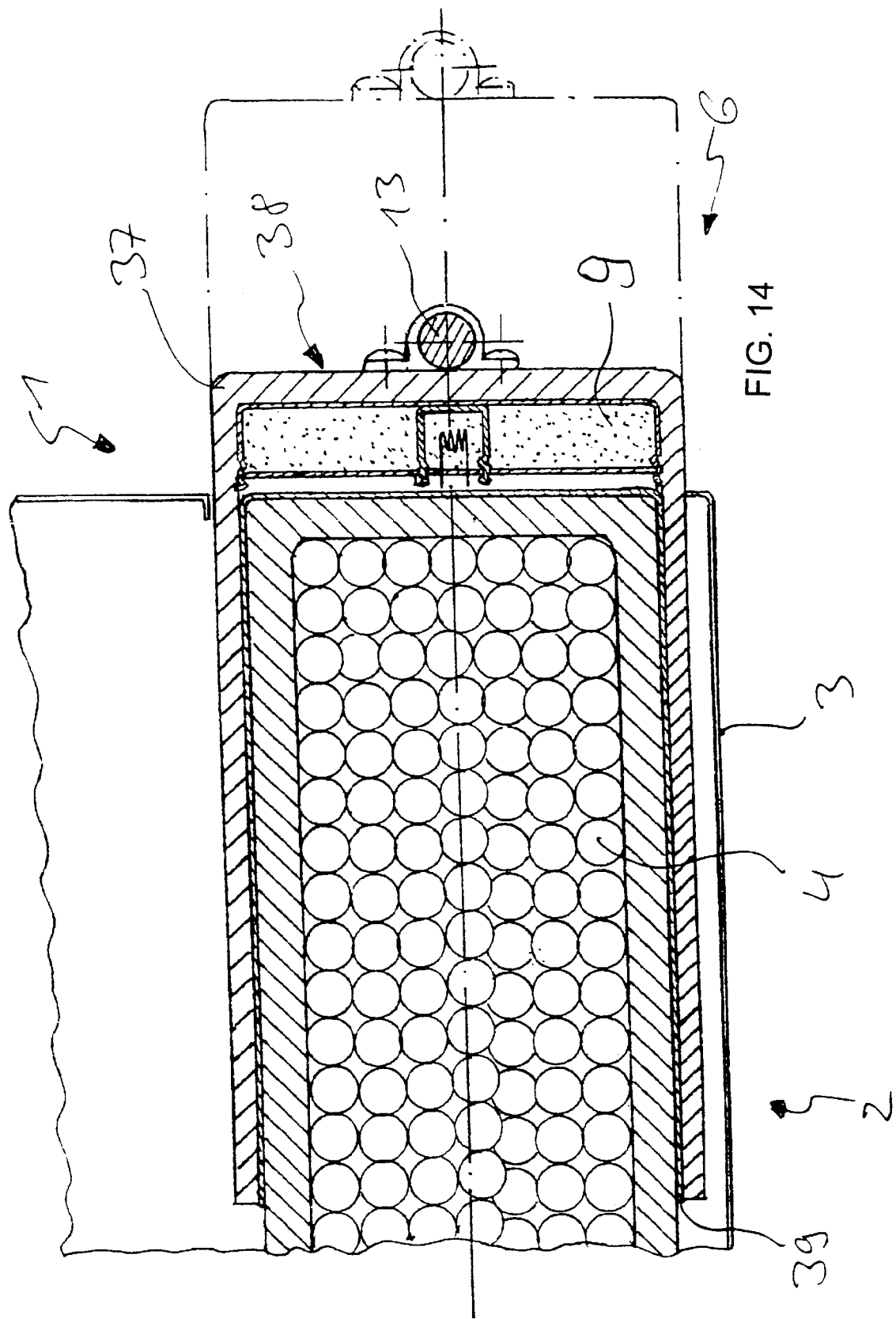
FIG. 14 is an enlarged diagrammatic sectional view of a fifth modification for an airbag device according to the invention.

FIG. 14 shows an alternative, in which a pressure cup 37 like the reservoir 12 in the first exemplary embodiment (see also FIG. 1) is put over the existing airbag gas generator 4 such that the pressure cup 37 fits over the airbag gas generator 4. The airbag gas generator 4 assumes the function of the cylinder. A pyrotechnic drive gas generator 9 for the airbag flaps 8 is accommodated in the pressure cup 37 such that the drive gas generator 9 is provided between the airbag gas generator 4 and the pressure cup 37. A driver 13 for the rest of the opening mechanism of the mechanical configurations 6 is correspondingly fixed to the pressure cup 37 on the head 38. A sliding and sealing intermediate layer 39 is preferably placed between the airbag gas generator 4 and the pressure cup 37. According to the invention, the material of the sliding and sealing intermediate layer 39 is selected such that it melts at the detonation temperature. The material thus melts at the leading edge and thus forms a seal at the leading edge. One example of a material that can be used is the plastic POM (Polyoxymethylene). The variant according to FIG. 14 is more cost-effective than the configuration shown in FIG. 13.

Figure 15:
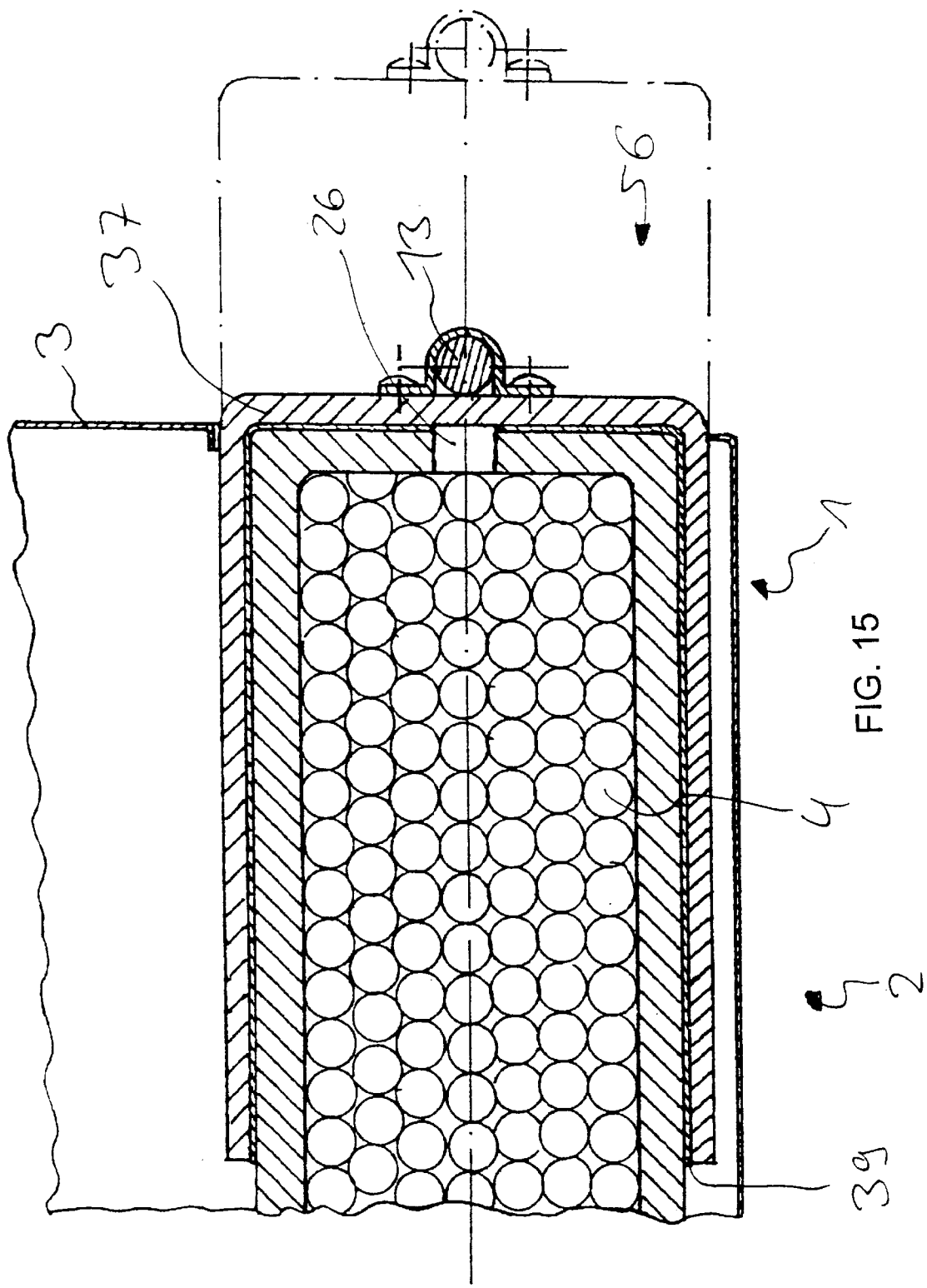
FIG. 15 is an enlarged diagrammatic sectional view of a sixth modification for an airbag device according to the invention.

The alternative embodiment shown in FIG. 15 is constructed like that in FIG. 14, but without a separate drive gas generator 9 for opening the flap. Here the pressure cup 37 is supplied with gas through a gas passage or through-flow hole 26 from the airbag gas generator 4. This is an especially favorable solution from the point of view of stowage, and at the same time cost-effective. In addition, the piston 20 can here be used to open the gas admission to the airbag 5 through the use of its "shroud" once the airbag flaps 8 have opened. The variant according to FIG. 15 is the most cost-effective, compared to the configurations shown in FIGS. 13 and 14. With regard to other variants as referred to above, for example, and in the above-mentioned applications assigned to the assignee of the present invention, the configuration according to FIG. 15 can also be realized without any significant additional costs.

A further aspect of the configuration according to FIG. 15 is the following: The gas for the flap mechanism is less than 1% of the airbag gas, that is, for example 150 cm$^3$×30 bar in the case of a stiff flap, equal to 4.5 liters, and, for example 150 cm$^3$×20 bar in the case of an easily moving flap, equal to 3 liters, which results in a difference of 1.5 liters. A front passenger airbag has 90 l×2 bar, that is a gas capacity of 180 liters. Which means that 1.5 liters represent less than 1% of this number.

Figure 16:
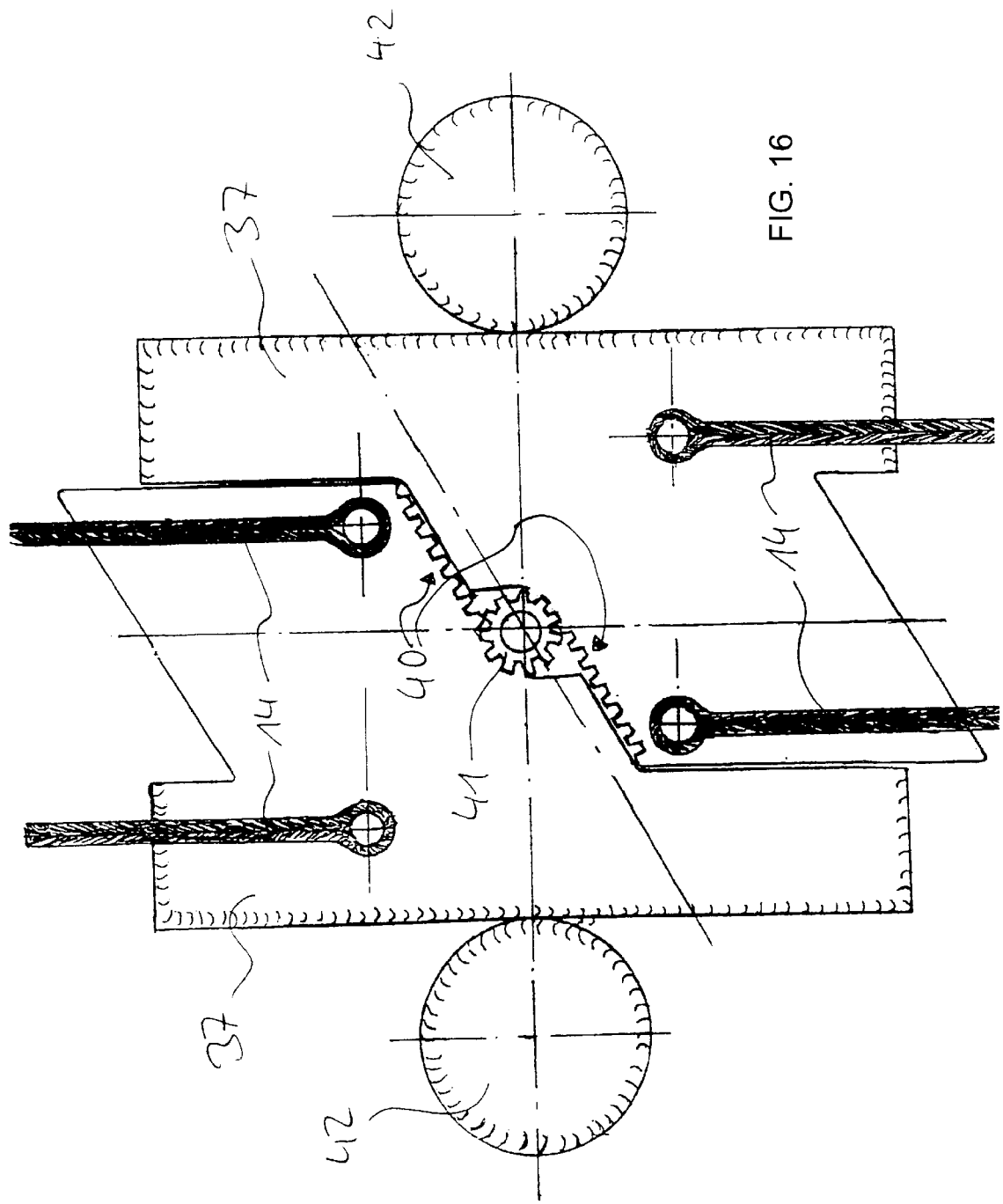
FIGS. 16 and 17 are enlarged diagrammatic top views of a seventh modification for an airbag device according to the invention before and, respectively, after a triggering of the airbag device.

FIG. 16 shows two pressure cups 37, which are located on both sides over the airbag gas generator 4 situated between them. The pressure cups 37 fit into one another with inclined walls 40 in such a way that when moved apart they are necessarily bound to rotate. In order that the two pressure cups 37 run synchronously, a stationary gear 41, fixed to the airbag gas generator 4 and/or to the external housing 3 of the airbag module 2, is located between their inclined surfaces or walls 40, which are configured as a toothed rack. This configuration forces the pressure cups 37 to run synchronously in a helical or rotational manner. Two cables 14, which at the other end are connected to the airbag flaps (not shown), are inserted forming a positive interlock on each pressure cup 37. Since the pressure cups 37 are enclosed, interlocking internally with the airbag gas generator 4 and externally with a circular module housing 3, for example, the cables 14 cannot detach or "unbutton". As they separate, the pressure cups 37 automatically open a gas passage (not shown) from the airbag gas generator 4 to the airbag 5. FIG. 16 shows the "unwinding" of the cylindrical pressure cups 37 with their two covers 42. As stated, punched sheet metal plates are rolled and welded to form finished parts.

Figure 17:
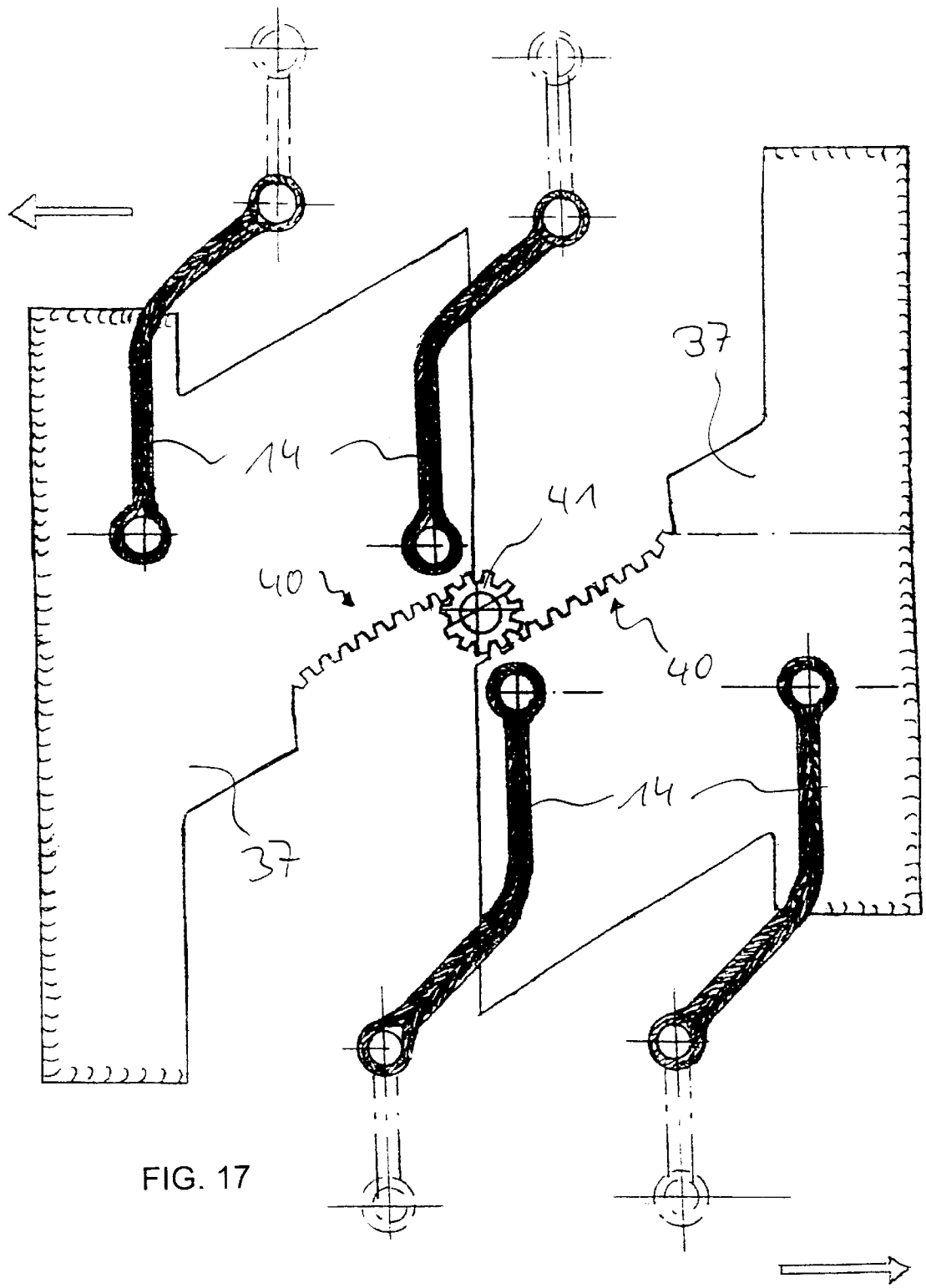

FIG. 17 shows, likewise in unwound form, the position of the pressure cups 37 following a crash. They have drawn the cables 14, which are attached to the airbag covers (not shown) "helically" or "rotationally" downward and forward in opposite directions. The cables 14 leave the pressure cups 37 tangentially.

Figure 18:
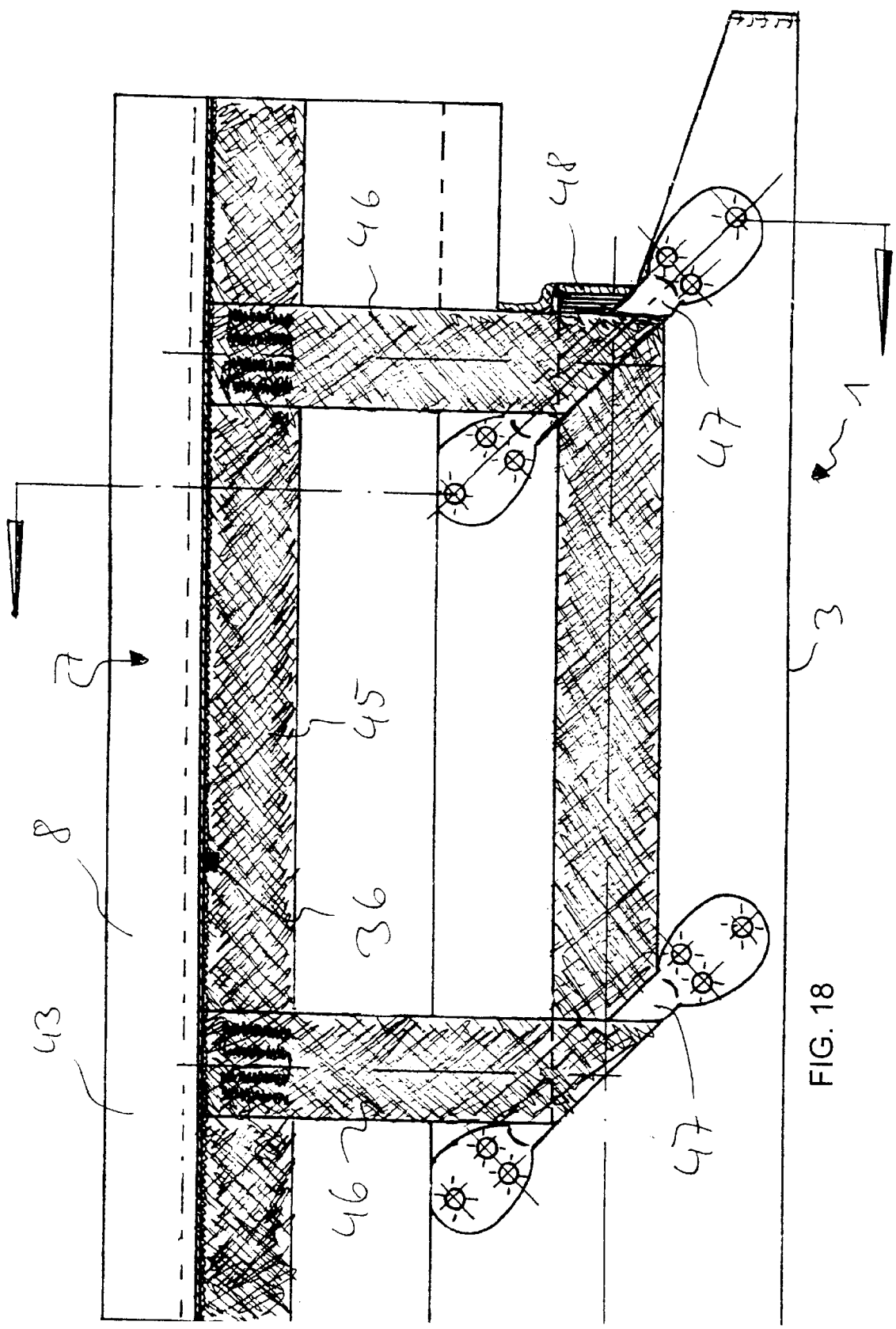
FIG. 18 is an enlarged diagrammatic top view of an eighth modification for an airbag device according to the invention.
Figure 19:
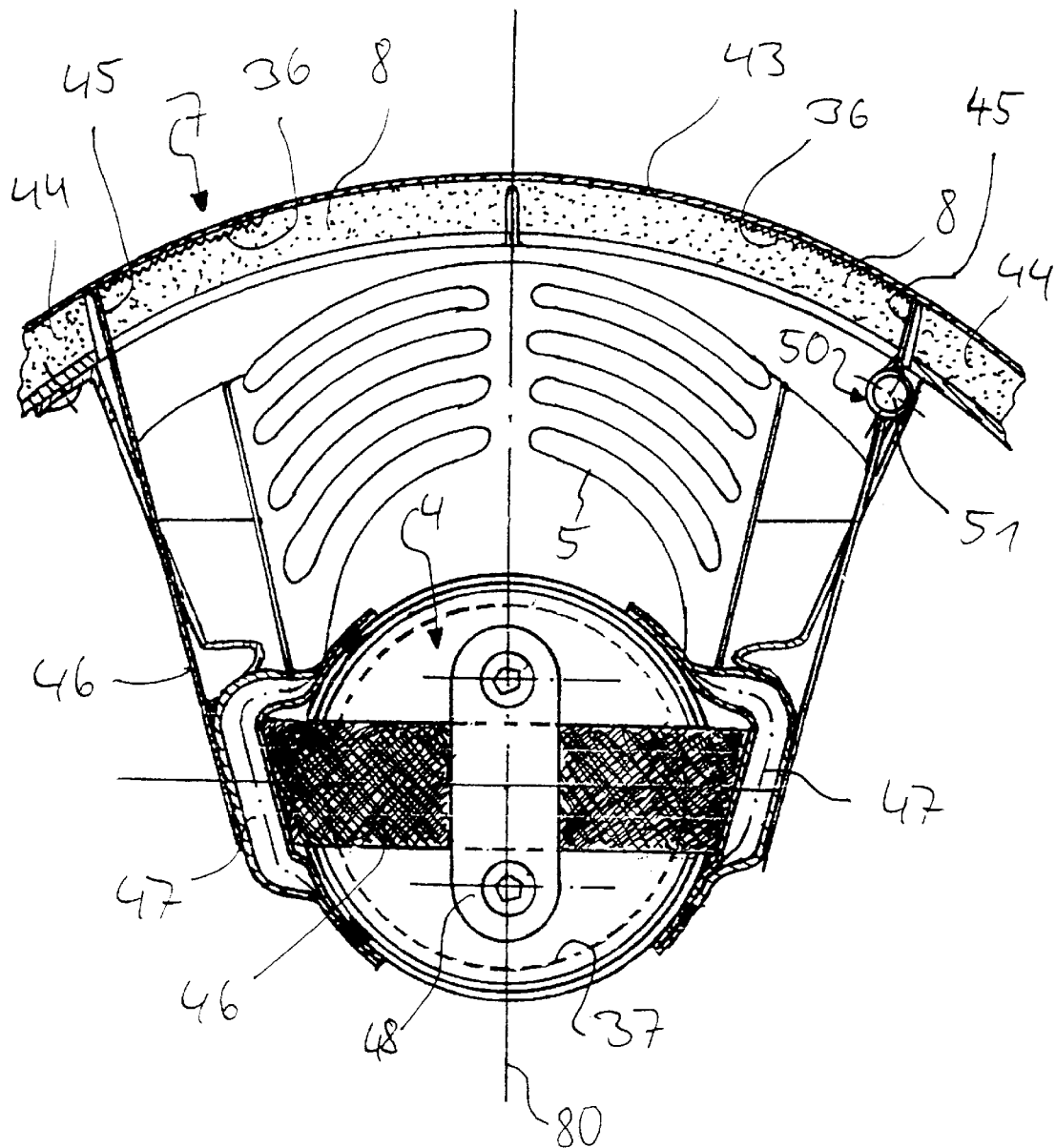
FIG. 19 is a diagrammatic sectional view of an airbag device for illustrating a sixth and, respectively, a seventh embodiment according to the invention with a modification according to the variant shown in FIG. 18.

FIGS. 18 and 19 show an airbag cover or an airbag flap 8, the outer skin 43 of which is joined to a fabric 36 either adhesively or by inserting the fabric 36 into the outer film or skin 43 of the dashboard 44. A band 45 is stitched to this fabric 36 in a force-locking manner. Draw bands 46, which are each deflected by 90 degrees around deflection bars 47, are stitched at right angles to the band 45 distributing the tensile force. The ends of the draw bands 46 are then fixed at the end face to a pressure cup 37 through the use of a clamp 48, for example. The pressure cup 37 is put over the airbag gas generator or a separate drive gas generator 4 or 9 and, after actuation of the latter by the gas pressure fed from the generator or from a separate cartridge in the event of crash, pulls the draw bands 46, which are fixed to the airbag flap 8, downward.

The left side of FIG. 19, to the i.e. left of line 80, shows a front view of an airbag module 2 constructed from the above-mentioned components, with the deflection bars 47 and the clamp 48 for fixing the draw bands 46. The right side of FIG. 19 shows a front view of an airbag module 2, in which the draw bands 46 are fixed to stitched-on bands 45 on the airbag cover 8 through the use of loops 50 with pins 51 inserted through them. An assembly that uses pins 51 makes it easier to fit the airbag module 2 to the dashboard 44.

Figure 20:
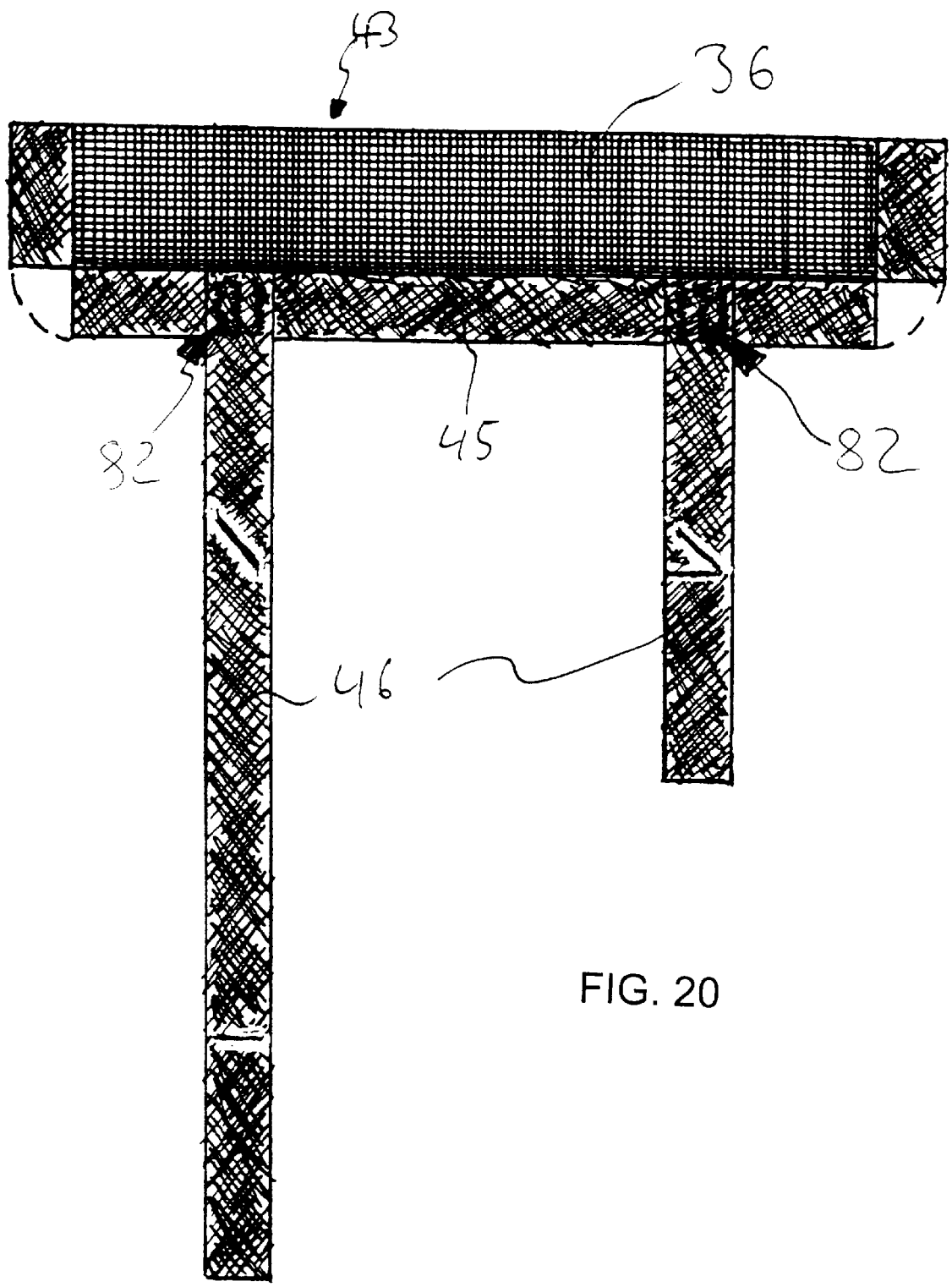
FIG. 20 is a diagrammatic top view a detail of the eighth modification according to FIG. 18.

FIG. 20 shows the fabric 36, which is joined in a force-locking manner to the film or outer skin 43 of the airbag cover 8. The "stitched assembly" also shows the stitched-on bands 45 and draw bands 46 of suitable length and their "folds" when being assembled as well as the seams 82. The fabric 36 with the stitched-on draw bands 46 and bands 45 forms part of the dashboard-airbag cover assembly or the corresponding subassembly. After fitting the airbag module 2 to the dashboard body, the draw bands 46 are inserted through the deflection bars 47 and screwed to the head end of the pressure cup 37 without any "slack" through the use of a clamp 48, for example (FIG. 18).

Figure 21:
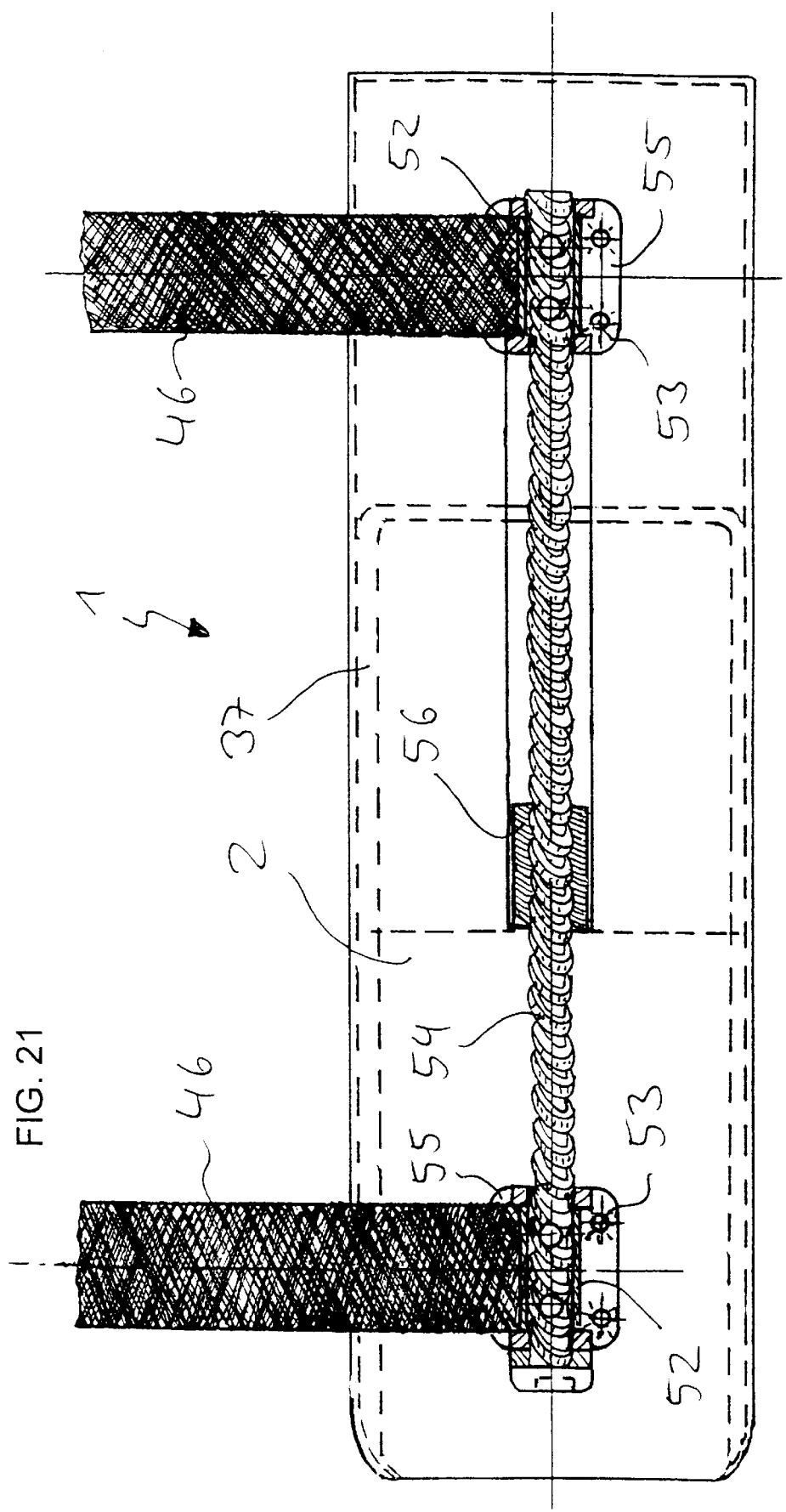
FIG. 21 a top view of a further variant of the eighth modification for an airbag device according to FIG. 18.
Figure 22:
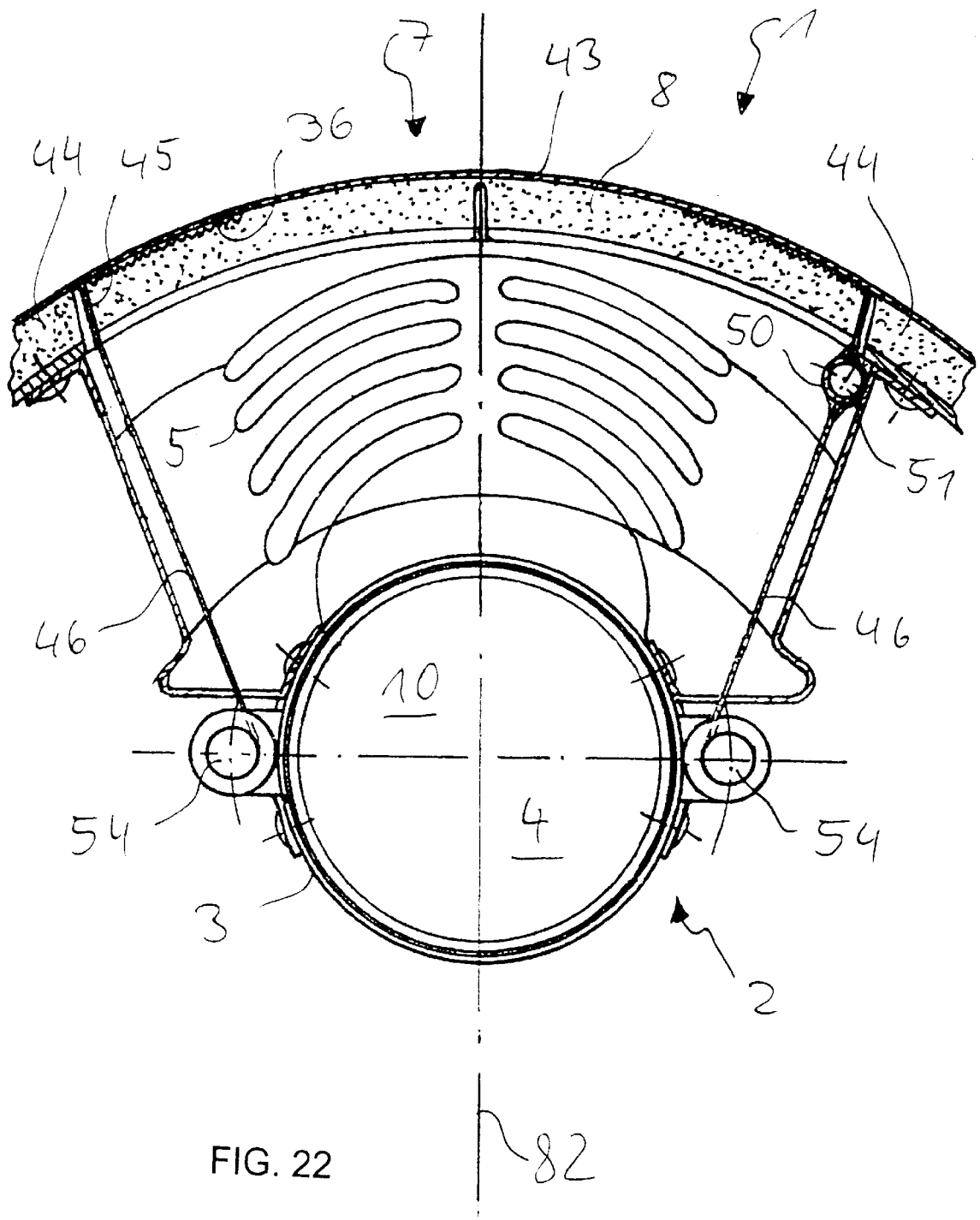
FIG. 22 is a diagrammatic sectional view of an airbag device for illustrating an eighth and, respectively, a ninth embodiment according to the invention with a modification according to the variant shown in FIG. 21.

A further alternative retractable airbag flap with a mechanism for pulling the draw bands 46 is shown in FIGS. 21 and 22. Here the draw bands 46 are fixed to a threaded spindle 54 through the use of a locking sleeve or clamping sleeve 52 and screws 53. The assembly or the subassembly is supported and rotatably fixed in bearing blocks 55. The bearing blocks 55 are fixed to the module housing 2. In a crash, the threaded spindle 54 (preferably having a low-friction, coarse-pitch thread, such as a trapezoidal thread) is turned by a nut 56, which is fixed in a force-locking manner to the pressure cup 37. When the pressure cup 37 moves (as described above), the threaded spindle 54 is forcibly turned and the draw bands 46 are wound up, thereby pulling the airbag flaps 8 into the airbag module.

Figure 23:
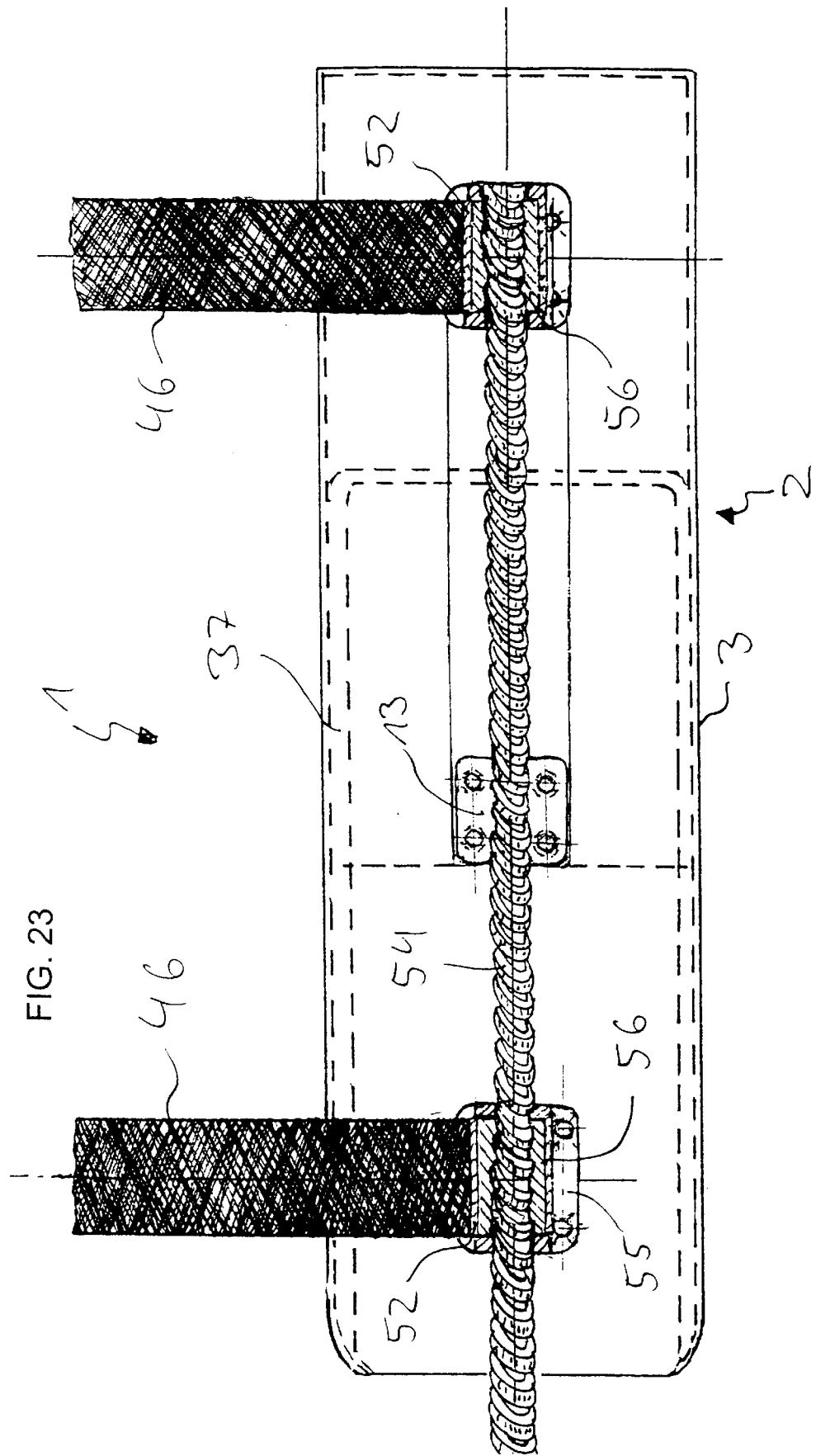
FIG. 23 is a top view of yet another variant of the eighth modification for an airbag device according to FIG. 18.

The left side of FIG. 22, i.e. to the left of line 82, is a sectional view of the end face of the above-described configuration. The bands 45 and draw bands 46 are fixed directly to the fabric 36, which forms part of the airbag flap 8. On the right side of FIG. 22 an alternative is shown wherein the bands are fixed to one another with a pin as is also shown in FIG. 19. FIG. 23 shows a similar alternative to that shown in FIG. 21. Here, however, the threaded spindle 54 is firmly fixed, so that it cannot rotate, to the driver 13 on the pressure cup 37. The thereby longitudinally traversable threaded spindle 54 turns nuts 56, which are secured in position in bearing blocks 55 fixed to the module housing 2. The draw bands 46 are fixed through the use of locking sleeves, 52, for example, to the circumference of the nuts 56. As the threaded spindle 54 moves axially, the nuts 56 turn and wind up the draw bands 46.

The figures of the drawing described below show yet further exemplary embodiments in connection with other airbags which are embodied as steering wheel airbags or front passenger airbags in or behind the dashboard.

Figure 24:
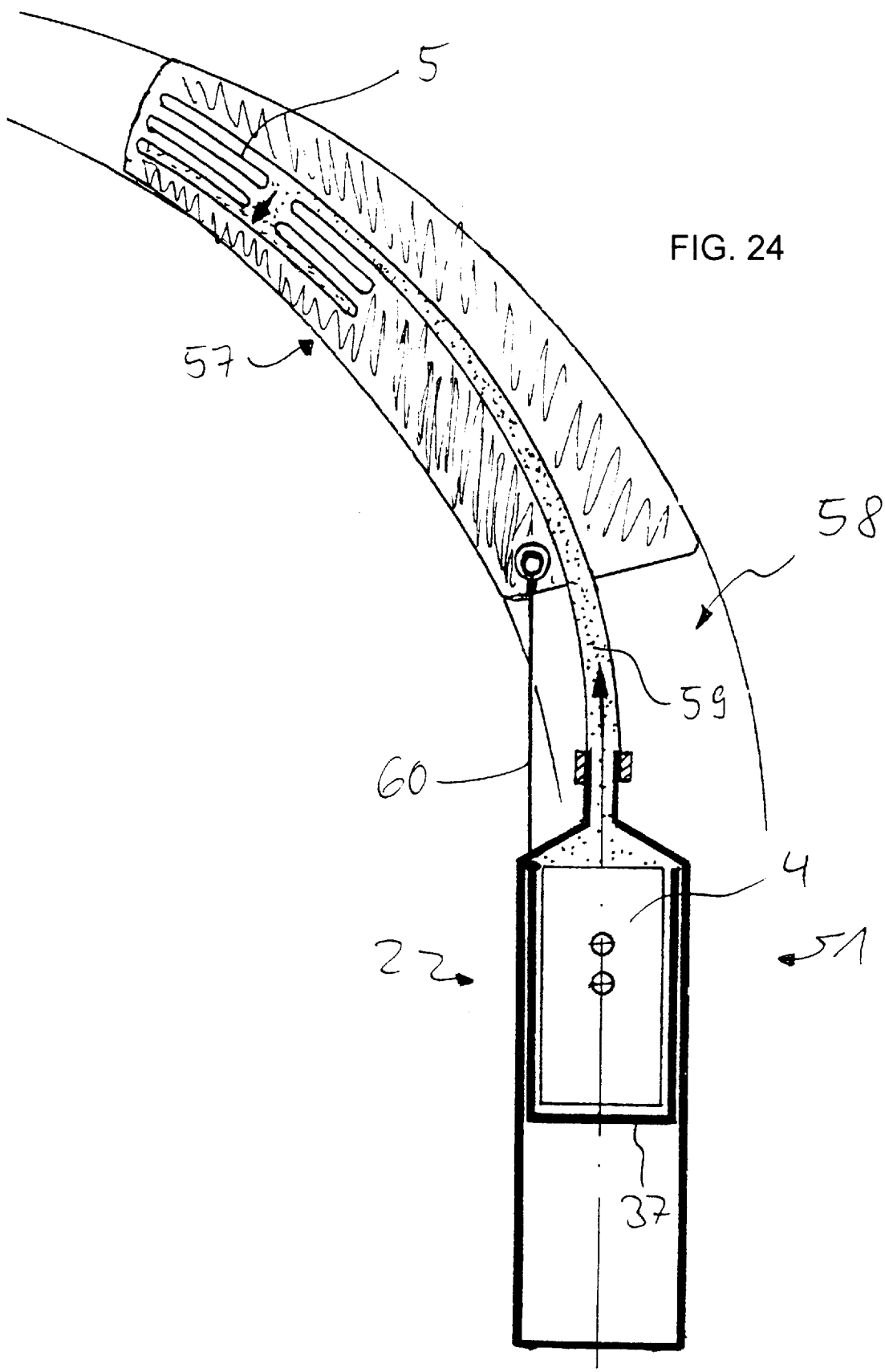
FIGS. 24 and 25 are diagrammatic sectional views of a tenth exemplary embodiment of an airbag device according to the invention before and, respectively, after a triggering of the airbag device.
Figure 25:
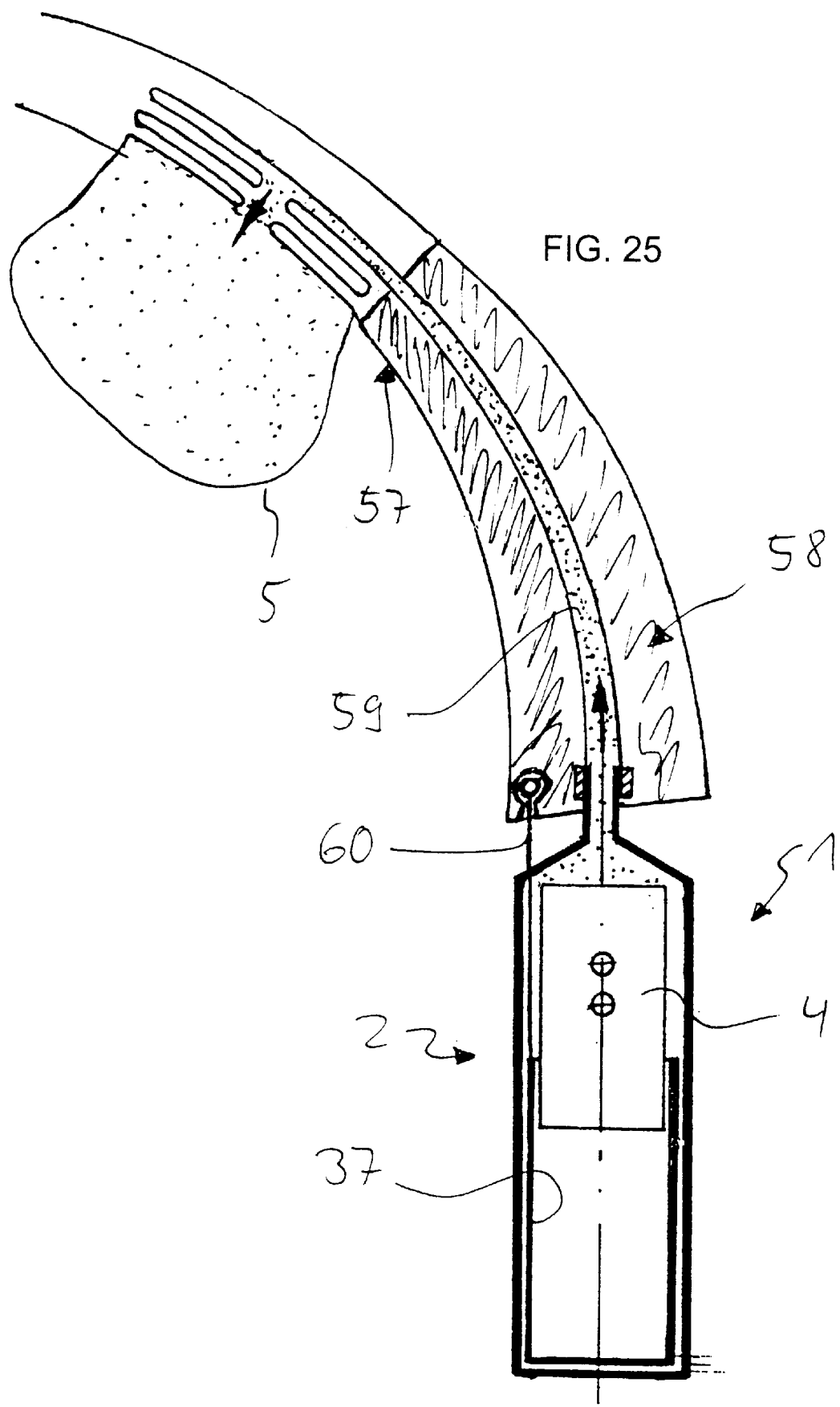

FIGS. 24 and 25 show an airbag 5 behind a column trim 57, in this case a column trim of the A-pillar 58. Here too, the same problem as in the case of the dashboard airbag is to be anticipated. If the airbag 5, before it can deploy, has first to eject the cover or trim 57, it must first be supplied with high pressure. This may potentially result in an undesired aggressiveness of the airbag.

In the embodiment of the invention shown in FIGS. 24 and 25 the airbag module 2, that is to say including the airbag gas generator 4, is fixed, according to the technical possibilities available, to the bottom of the A-pillar 58. In the event of a crash, gas flows from the airbag gas generator 4 by way of a hose 59 into the airbag 5. Before this happens, however, the gas must first move a pressure cup 37 or a hollow piston, which then first exposes a passage for the gas for filling the airbag 5 (two-stroke principle). The pressure cup 37 is connected by a connection 60 (for example a cable or Bowden cable) to the A-pillar trim 57 and pulls the A-pillar trim 57 away in a downward direction. The airbag 5 can thus deploy freely (see FIG. 25). A soft airbag folding, according to which the airbag 5 is inflated layer by layer, can in this embodiment, as in all other embodiments according to the present invention, advantageously support the "gentleness" of the system.

Figure 26:
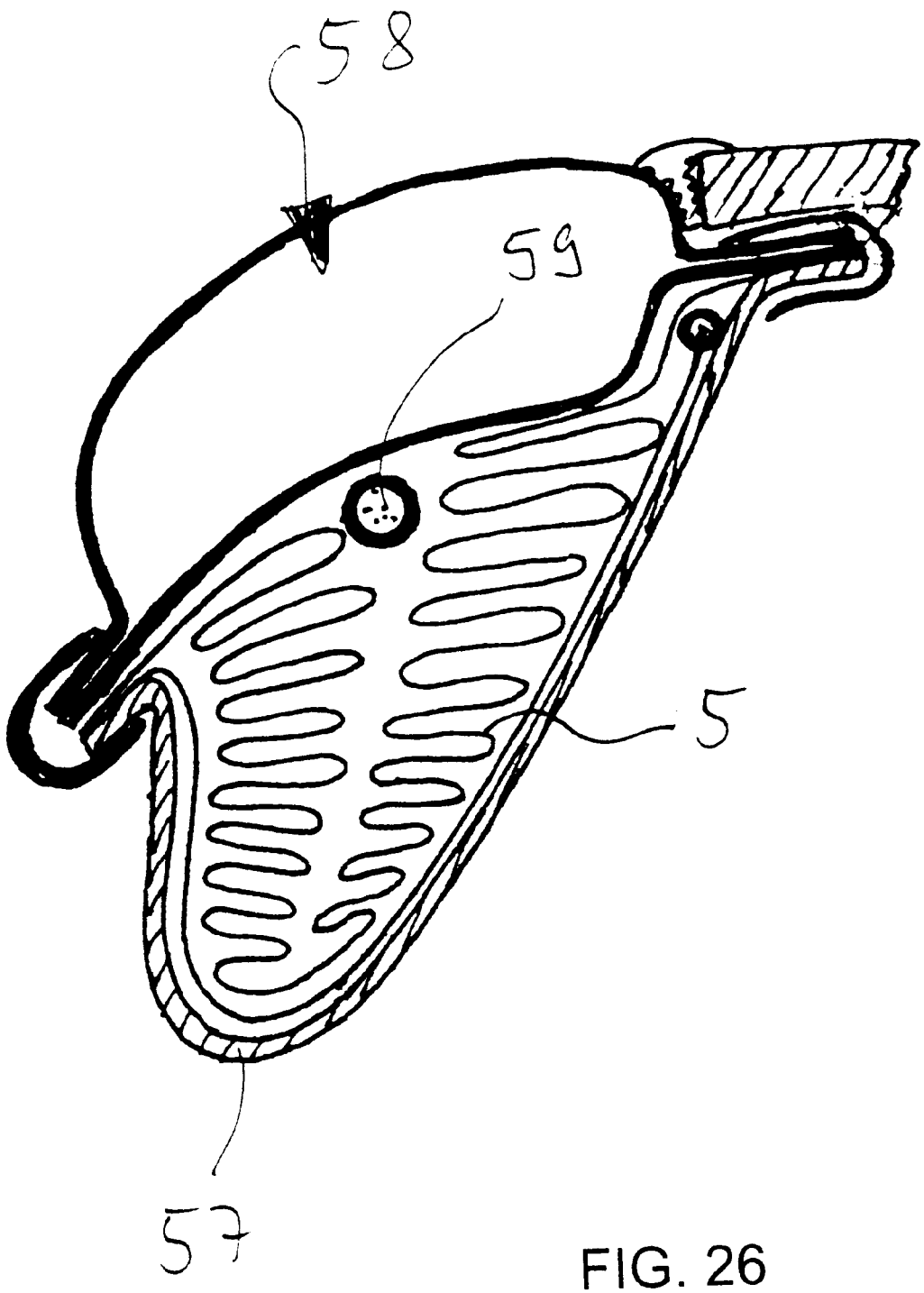
FIGS. 26 and 27 are diagrammatic sectional views of a variant of the tenth exemplary embodiment of an airbag device according to the invention before and, respectively, after a triggering of the airbag device.
Figure 27:
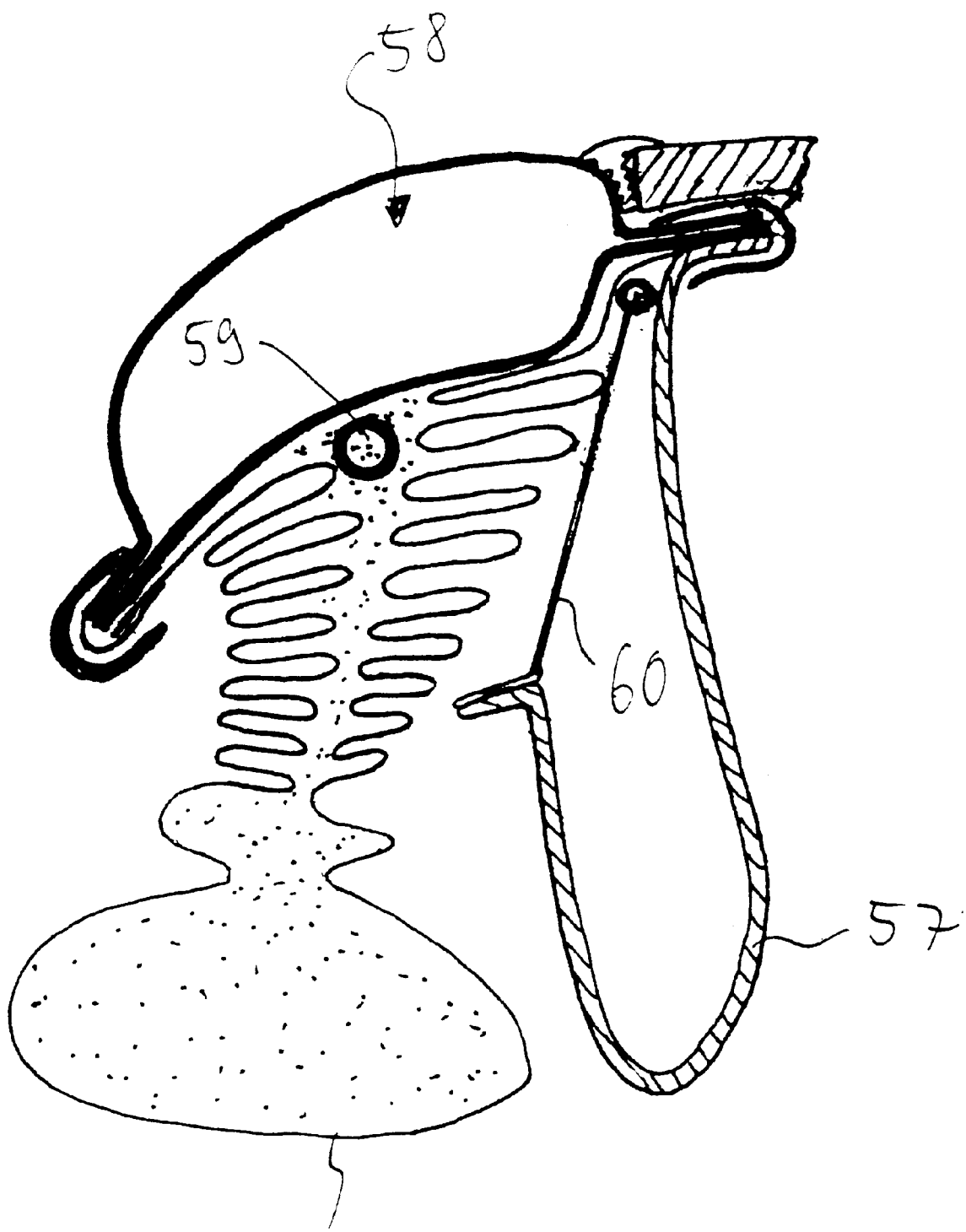

FIGS. 26 and 27 are cross-sectional views of an A-pillar of an embodiment similar to the variant according to FIGS. 24 and 25. In this case the trim is pulled away "transversely" (see FIG. 27).

Figure 28:
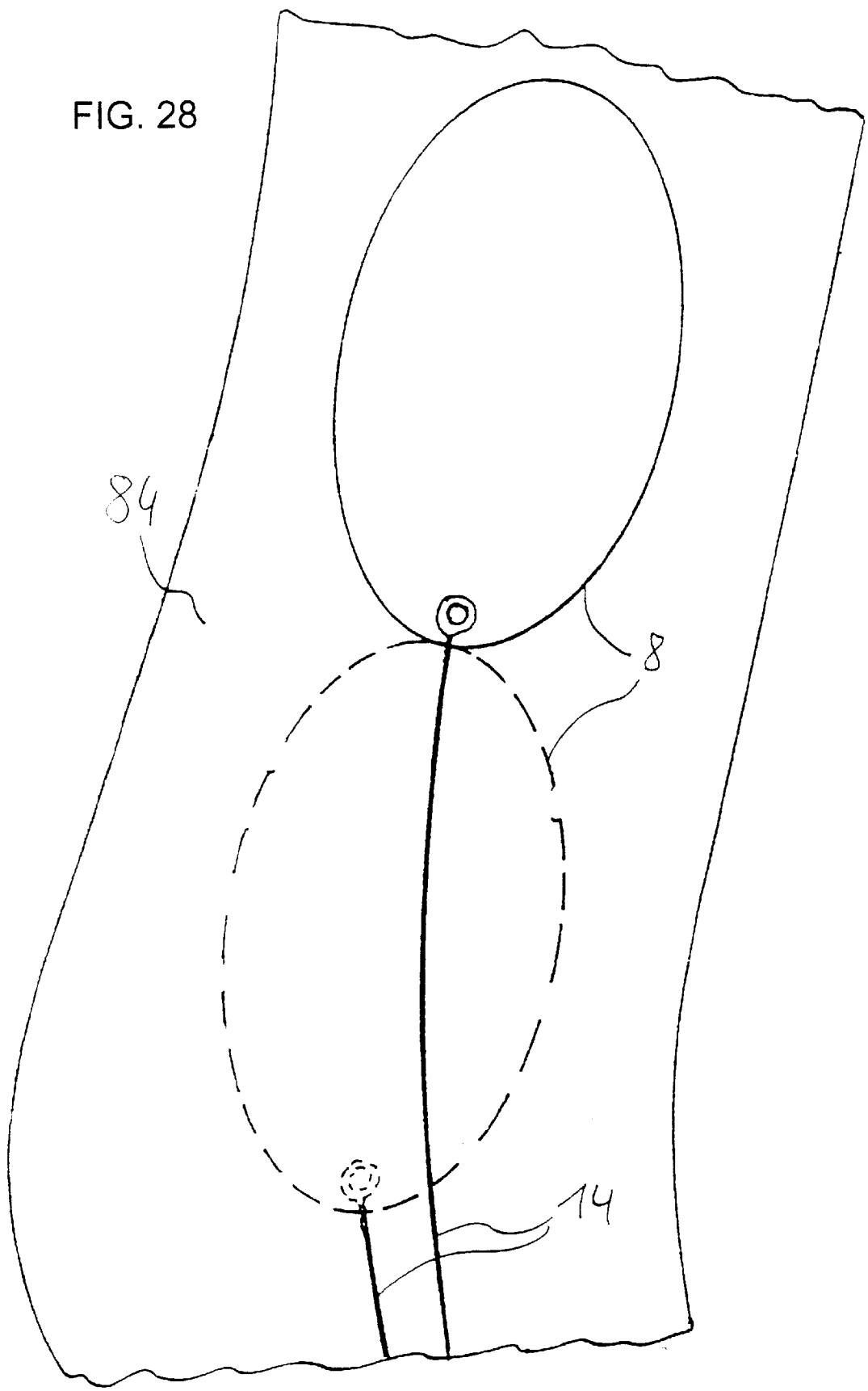
FIG. 28 is a diagrammatic sectional view of an eleventh exemplary embodiment of an airbag device according to the invention before and, respectively, after a triggering of the airbag device.

FIG. 28 shows the execution of the invention in a thorax bag mounted in a seat 84. Here too, the airbag cover 8 is pulled away beforehand through the use of a cable 14, for example.

In virtually all the alternatives of the present invention shown in the figures of the drawings, the airbag systems are fitted with a separate pyrotechnic gas generator for driving the corresponding opening mechanism for the airbag flap. It is obviously also possible to use the airbag gas generator to perform this work through the use of a correspondingly positioned gas passage hole or holes, as has also been described in detail, particularly in the applications mentioned above.

The invention is described and shown with reference to the exemplary embodiments in the description and in the drawings, however, is not confined to these exemplary embodiments. The invention includes all variations, modifications, substitutions and combinations, which the person skilled in the art will infer from the present document, particularly in the context of the claims and the general accounts in the introductory part of this description and the description of the exemplary embodiments and their representations in the drawings, and which the person skilled in the art will be capable of combining using specialist knowledge and the prior art, especially when incorporating the full disclosures of the above-mentioned applications. In particular, it is possible to combine all individual features and configuration possibilities of the invention and exemplary embodiments thereof.

I claim:

1. An airbag system, comprising:
    at least one cover configuration movable from a closed position to an open position;
    an airbag disposed behind said at least one cover configuration when said at least one cover configuration is in the closed position, said airbag being configured to expand when being filled with gas; and
    a control device including a gas generating configuration and a mechanical configuration, said gas generating configuration being configured to generate a gas pressure upon activation thereof, said mechanical configuration including a rotation device configured to be rotated by the gas pressure generated by said gas generating configuration, said gas generating configuration and said mechanical configuration operating as a drive configuration for moving said at least one cover configuration from the closed position to the open position for allowing said airbag to expand.

2. The airbag system according to claim 1, wherein:
    said gas generating configuration includes an airbag gas generator; and
    an airbag module holds at least said airbag gas generator and said airbag.

3. The airbag system according to claim 2, wherein said airbag module includes a housing, said housing is at least substantially formed of an extruded profile.

4. The airbag system according to claim 2, wherein said airbag module includes a housing, said mechanical configuration operating as said drive configuration for moving said at least one cover configuration from the closed position to the open position is at least partially disposed in said housing of said airbag module.

5. The airbag system according to claim 2, wherein said at least one cover configuration is combined with said airbag module.

6. The airbag system according to claim 2, wherein said at least one cover configuration is a vehicle interior trim part and is connected to said airbag module.

7. The airbag system according to claim 1, wherein said gas generating configuration includes a drive gas generator connected to said mechanical configuration.

8. The airbag system according to claim 2, wherein said gas generating configuration includes a drive gas generator constructed as an element separate from said airbag module and disposed at said airbag module.

9. The airbag system according to claim 2, wherein said gas generating configuration includes a drive gas generator constructed as an element separate from said airbag module and disposed separated from said airbag module.

10. The airbag system according to claim 1, wherein said mechanical configuration includes at least one drive unit configured to be acted upon by gas from said gas generating configuration, for moving said at least one cover configuration from the closed position to the open position.

11. The airbag system according to claim 10, wherein said at least one drive unit includes a piston.

12. The airbag system according to claim 10, wherein said at least one drive unit is a plurality of drive units, each of said drive units includes a respective piston.

13. The airbag system according to claim 1, wherein said at least one cover configuration is a plurality of cover configurations, said mechanical configuration is configured as a forced control configuration for driving said plurality of cover configurations in a coordinated manner.

14. The airbag system according to claim 1, wherein said mechanical configuration includes at least one element selected from the group consisting of cables, linkages and fabrics for transmitting a movement.

15. The airbag system according to claim 1, wherein:

said mechanical configuration includes a plurality of draw devices connected between said at least one cover configuration and said rotation device; and said rotation device is configured as a forced control configuration for driving said plurality of draw devices in a coordinated manner.

16. The airbag system according to claim 15, wherein:

said mechanical configuration includes a toothing;

said rotation device is a piston configured as a toothed roller; and said piston defines a piston axis, said toothed roller is configured to rotate about the piston axis in order to move, along said toothing, from a starting position to a limit position when said piston is provided with gas pressure from said gas generating configuration.

17. The airbag system according to claim 15, wherein:

said rotation device is a threaded spindle;

said threaded spindle is rotatably held in bearing blocks; and a nut on said threaded spindle is configured to be moved by gas pressure generated by said gas generating configuration, such that said threaded spindle is rotated by a movement of said nut.

* * * * *